US010791337B2

(12) United States Patent
Hendry et al.

(10) Patent No.: US 10,791,337 B2
(45) Date of Patent: *Sep. 29, 2020

(54) METHOD AND APPARATUS FOR SIGNALING IMAGE INFORMATION, AND DECODING METHOD AND APPARATUS USING SAME

(71) Applicant: LG Electronics Inc., Seoul (KR)

(72) Inventors: Hendry Hendry, Seoul (KR); Seungwook Park, Seoul (KR); Jaehyun Lim, Seoul (KR); Yongjoon Jeon, Seoul (KR); Chulkeun Kim, Seoul (KR); Jungsun Kim, Seoul (KR); Naeri Park, Seoul (KR); Byeongmoon Jeon, Seoul (KR); Joonyoung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,810

(22) Filed: May 8, 2019

(65) Prior Publication Data

US 2019/0268620 A1 Aug. 29, 2019

Related U.S. Application Data

(63) Continuation of application No. 15/421,528, filed on Feb. 1, 2017, now Pat. No. 10,321,154, which is a
(Continued)

(51) Int. Cl.
*H04N 19/46* (2014.01)
*H04N 19/577* (2014.01)
(Continued)

(52) U.S. Cl.
CPC ......... *H04N 19/577* (2014.11); *H04N 19/423* (2014.11); *H04N 19/44* (2014.11);
(Continued)

(58) Field of Classification Search
CPC ...... H04N 19/423; H04N 19/44; H04N 19/46; H04N 19/503; H04N 19/573; H04N 19/577; H04N 19/70
(Continued)

(56) References Cited

U.S. PATENT DOCUMENTS 8,982,183 B2  3/2015  Jeon
9,451,284 B2  9/2016  Wang
(Continued)

FOREIGN PATENT DOCUMENTS

CN  101300851  11/2008
CN  101611633  12/2009
(Continued)

OTHER PUBLICATIONS

International Search Report dated Feb. 28, 2013 for Appln No. PCT/KR2012/007614, with English Translation, 6 pages.
(Continued)

*Primary Examiner* — Shan E Elahi
(74) *Attorney, Agent, or Firm* — Fish & Richardson P.C.

(57) ABSTRACT

The present invention relates to a method for signaling image information and to a decoding method using same. The method for signaling image information according to the present invention comprises: a step of performing inter-prediction for a current picture; and a step of signaling information including the result of said inter-prediction and reference picture information indicating reference pictures usable in said inter prediction, wherein said reference picture information contains pieces of picture order count (POC) information of said usable reference pictures. The POC information of said usable reference pictures in said reference picture information is configured such that POCs for the pictures existing before said current picture in terms of a POC sequence are located at the front, and POCs for the
(Continued)

pictures existing after said current picture in terms of a POC sequence are located following the POCs located at the front.

11 Claims, 8 Drawing Sheets

Related U.S. Application Data continuation of application No. 14/346,879, filed as application No. PCT/KR2012/007614 on Sep. 21, 2012, now Pat. No. 9,571,834.

(60) Provisional application No. 61/537,586, filed on Sep. 22, 2011.

(51) Int. Cl.
*H04N 19/503* (2014.01)
*H04N 19/70* (2014.01)
*H04N 19/423* (2014.01)
*H04N 19/573* (2014.01)
*H04N 19/44* (2014.01)

(52) U.S. Cl.
CPC ........... *H04N 19/46* (2014.11); *H04N 19/503* (2014.11); *H04N 19/573* (2014.11); *H04N 19/70* (2014.11)

(58) Field of Classification Search
USPC .................................................... 375/240.15
See application file for complete search history.

(56) References Cited

U.S. PATENT DOCUMENTS

| | | | |
|---|---|---|---|
| 9,516,379 B2 * | 12/2016 | Chen | H04N 19/426 |
| 9,532,052 B2 * | 12/2016 | Chen | H04N 19/68 |
| 2004/0013308 A1 | 1/2004 | Jeon | |
| 2004/0080669 A1 | 4/2004 | Nagai | |
| 2006/0262981 A1 | 11/2006 | Jeon | |
| 2007/0160144 A1 | 7/2007 | Lu | |
| 2008/0037636 A1 | 2/2008 | Jeon | |
| 2008/0037645 A1 | 2/2008 | Jeon | |
| 2008/0037646 A1 | 2/2008 | Jeon | |
| 2008/0037885 A1 | 2/2008 | Jeon | |
| 2008/0037886 A1 | 2/2008 | Jeon | |
| 2008/0043849 A1 | 2/2008 | Jeon | |
| 2008/0044093 A1 | 2/2008 | Jeon | |
| 2008/0044094 A1 | 2/2008 | Jeon | |
| 2008/0095245 A1 | 4/2008 | Reznik | |
| 2008/0117985 A1 * | 5/2008 | Chen | H04N 19/573 375/240.26 |
| 2009/0034618 A1 | 2/2009 | Fu | |
| 2009/0175349 A1 | 7/2009 | Ye | |
| 2009/0196342 A1 | 8/2009 | Divorra Escoda | |
| 2009/0232199 A1 | 9/2009 | Kobayashi et al. | |
| 2009/0238269 A1 * | 9/2009 | Pandit | H04N 19/597 375/240.12 |
| 2009/0252218 A1 | 10/2009 | Nakagawa et al. | |
| 2009/0296811 A1 | 12/2009 | Jeon | |
| 2009/0304068 A1 | 12/2009 | Pandit | |
| 2010/0020871 A1 * | 1/2010 | Hannuksela | H04N 19/573 375/240.12 |
| 2010/0189182 A1 | 7/2010 | Hannuksela | |
| 2010/0246683 A1 * | 9/2010 | Webb | H04N 19/44 375/240.16 |
| 2010/0316361 A1 * | 12/2010 | Jeon | H04N 19/50 386/355 |
| 2011/0194613 A1 | 8/2011 | Chen | |
| 2011/0261880 A1 | 10/2011 | Auyeung | |
| 2011/0298895 A1 * | 12/2011 | Tian | H04N 19/70 348/46 |
| 2011/0317757 A1 | 12/2011 | Coban | |
| 2012/0189058 A1 * | 7/2012 | Chen | H04N 19/159 375/240.15 |
| 2012/0250773 A1 | 10/2012 | Chien | |
| 2013/0077691 A1 | 3/2013 | Zheng | |
| 2013/0114742 A1 | 5/2013 | Hannuksela | |
| 2013/0136176 A1 | 5/2013 | Chen | |
| 2013/0142259 A1 | 6/2013 | Lim | |
| 2013/0188738 A1 | 7/2013 | Hannuksela | |
| 2013/0272404 A1 | 10/2013 | Park | |
| 2013/0322538 A1 | 12/2013 | Seregin | |
| 2014/0169459 A1 | 6/2014 | Zhang | |
| 2014/0233647 A1 * | 8/2014 | Hendry | H04N 19/46 375/240.15 |
| 2015/0156501 A1 | 6/2015 | Hannuksela | |
| 2015/0181233 A1 | 6/2015 | Ramasubramonian | |
| 2015/0195572 A1 | 7/2015 | Chen | |
| 2015/0201212 A1 | 7/2015 | Zhang | |
| 2015/0264366 A1 | 9/2015 | Hendry | |
| 2015/0373342 A1 | 12/2015 | Hendry | |
| 2018/0084260 A1 | 3/2018 | Chien | |
| 2018/0131951 A1 | 5/2018 | Hannuksela | |

FOREIGN PATENT DOCUMENTS

| | | |
|---|---|---|
| CN | 101841708 | 9/2010 |
| CN | 102036066 | 4/2011 |
| JP | 2011-077722 | 4/2011 |
| JP | 2014-531724 | 11/2014 |
| JP | 6272759 B2 | 1/2018 |
| KR | 20050049465 | 5/2005 |
| KR | 10-2008-0034752 | 4/2008 |
| KR | 10-2009-0039705 | 4/2009 |
| KR | 10-0943627 | 2/2010 |
| WO | 2013/002701 | 1/2013 |
| WO | 2013/042995 | 3/2013 |

OTHER PUBLICATIONS

Sjöberg et al., "Absolute signaling of reference pictures," JCT-VC of ITU-T SG16 WP3 and ISO/IEC JTC1/SC29/WG11 (6th meeting), Jul. 2011, 15 pages.
Sjöberg et al., "Absolute signaling of reference pictures," JCT-VC of ITU-T SG16 WP3 and ISO/IEC JTC1/SC29/WG11 (6th meeting), Jul. 2011, 29 pages (Working Draft).
ITU-T, ITU-T H.264, 2009, 2 pages.
V Park et al, "A prioritized multi-queue method for H.264/AVC live streaming in wireless networks," IEEE Ninth International Conference on Computer and Information Technology, 2009, 331-336.
Maani et al, "Optimized bit extraction using distortion estimation in the scalable extension of H.264/AVC," Tenth IEEE International Symposium on Multimedia, 2008, 660-666.
Lim et al., "Reference Lists for Low Delay Settings," 'JCTVC-F433', Joint Collaborative Team on Video Coding (JCT-VC), of ITU-T SG16 WP3 and ISO/IEC JTC1/SC29/WG11, 6th Meeting: Torino, IT, Jul. 14-22, 2011, 9 pages.
Sjöberg et al., "Absolute signaling of reference pictures," 'JCTVC-F493', Joint Collaborative Team on Video Coding (JCT-VC), of ITU-T SG16 WP3 and ISO/IEC JTC1/SC29/WG11, 6th Meeting: Torino, 2011, 15 pages.
"Proposed changes to the HEVC Working Draft. Absolute signaling of reference pictures," 'JCTVC-F493_WD_changes', Joint Collaborative Team on Video Coding (JCT-VC), of ITU-T SG16 WP3 and ISO/IEC JTC1/SC29/WG11, 6th Meeting: Torino, 2011, 28 pages.
Tan et al., "AHG21: Inter reference picture set prediction syntax and semantics," 'JCTVC-G198r2', Joint Collaborative Team on Video Coding (JCT-VC), of ITU-T SG16 WP3 and ISO/IEC JTC1/SC29/WG11, 7th Meeting: Geneva, CH, Nov. 21-30, 2011, 12 pages.
Wahadaniah et al., "AHG21: Construction and modification of predefined reference picture sets and reference picture lists," 'JCTVC-G548', Joint Collaborative Team on Video Coding (JCT-VC), of ITU-T SG16 WP3 and ISO/IEC JTC1/SC29/WG11, 7th Meeting: Geneva, CH, Nov. 21-30, 2011, 21 pages.
Hannuksela et al., "AHG21: On reference picture list construction and reference picture marking," 'JCTVC-G643r1', Joint Collabora-

(56) References Cited

OTHER PUBLICATIONS tive Team on Video Coding (JCT-VC), of ITU-T SG16 WP3 and ISO/IEC JTC1/SC29/WG11, 7th Meeting: Geneva, CH, Nov. 21-30, 2011, 17 pages.

Ramasubramonian et al., "Signalling of long-term reference pictures in the SPS," 'JCTVC-I0340r2', Joint Collaborative Team on Video Coding (JCT-VC), of ITU-T SG16 WP3 and ISO/IEC JTC1/SC29/WG11, 9th Meeting: Geneva, Switzerland, Apr. 27-May 7, 2012, 9 pages.

* cited by examiner

METHOD AND APPARATUS FOR SIGNALING IMAGE INFORMATION, AND DECODING METHOD AND APPARATUS USING SAME

CROSS REFERENCE TO RELATED APPLICATIONS

This application is a continuation of U.S. application Ser. No. 15/421,528, filed on Feb. 1, 2017, now allowed, which is a continuation of U.S. application Ser. No. 14/346,879, filed on Mar. 24, 2014, now U.S. Pat. No. 9,571,834, which is a U.S. National Phase of International Application PCT/KR2012/007614, filed on Sep. 21, 2012, which claims the benefit of U.S. Provisional Application No. 61/537,586, filed on Sep. 22, 2011, the entire contents of which are hereby incorporated by reference in their entirety.

TECHNICAL FIELD

The present invention relates to video compression techniques, and more particularly, to method and device for efficiently signaling video information and decoding method and device using the same.

BACKGROUND ART

Recently, demands for a high-resolution and high-quality image have increased in various fields of applications. As an image has higher resolution and higher quality, an amount of information on the video increases more.

Accordingly, when video information is transferred using media such as existing wired or wireless broadband lines or video information is stored in existing storage media, the information transfer cost and the information storage cost increase.

High-efficiency video compressing techniques can be used to effectively transfer, store, and reproduce information on high-resolution and high-quality images.

Inter prediction and intra prediction can be used to enhance video compression efficiency. In the inter prediction, pixel values of a current picture are predicted with reference to information of other pictures. In the intra prediction, pixel values of a current picture are predicted using inter-pixel relationships in the same picture.

When the inter prediction is carried out, a video encoder and a video decoder can perform a prediction process on the basis of a reference picture list indicating reference pictures which can be used for a current block (current picture).

Information for constructing a reference picture list can be transmitted from the video encoder to the video decoder. The video decoder can construct a reference picture list on the basis of the information received from the video encoder and can effectively perform the inter prediction.

SUMMARY OF THE INVENTION

Technical Problem

An object of the present invention is to provide method and device for effectively signaling video information in encoding/decoding the video information.

Another object of the present invention is to provide method and device for effectively signaling information for inter prediction in encoding/decoding video information.

Still another object of the present invention is to provide method and device for effectively signaling information for constructing a reference picture list used to perform an inter prediction.

Still another object of the present invention is to provide method and device for effectively constructing a reference picture list used to perform an inter prediction on the basis of received information.

Solution to Problem

According to an aspect of the present invention, there is provided a method of signaling video information, including the steps of performing an inter prediction on a current picture; and signaling information which includes reference picture information indicating the result of the inter prediction and reference pictures available in the inter prediction, wherein the reference picture information includes picture order count (POC) information elements of the available reference pictures, and wherein the POC information elements of the available reference pictures in the reference picture information are arranged so that POC values of pictures previous to the current picture in an POC order are located in front, and POC values of pictures subsequent to the current picture in the POC order are located subsequently.

At this time, the POC information elements may be arranged in a POC descending order of reference pictures for the reference pictures previous to the current picture in the POC order and may be arranged in a POC ascending order of reference pictures for the reference pictures subsequent to the current picture in the POC order.

The POC information elements may include a POC difference between a target reference picture and another picture out of the reference pictures indicated by the reference picture information, and the POC information elements of the reference pictures may be arranged in the reference picture information on the basis of the POC value of the target reference picture.

The POC information elements of the reference pictures may include the magnitude and the sign of a POC difference between a target reference picture and a criterion picture out of the reference pictures indicated by the reference picture information, and the POC information elements of the reference pictures in the reference picture information may be arranged on the basis of the POC values of the target reference pictures.

At this time, the POC information elements in the reference picture information may be arranged in a POC descending order of reference pictures for the reference pictures previous to the current picture in the POC order and may be arranged in a POC ascending order of reference pictures for the reference pictures subsequent to the current picture in the POC order. When the target reference picture is any one of the picture closest to the current picture out of the pictures previous to the current picture in the POC order and the picture closest to the current picture out of the pictures subsequent to the current picture in the POC order in the reference pictures indicated by the reference picture information, the criterion picture may be the current picture. When the target reference picture is not any one of the picture closest to the current picture out of the pictures previous to the current picture in the POC order and the picture closest to the current picture out of the pictures subsequent to the current picture in the POC order in the reference pictures indicated by the reference picture information, the criterion picture may be the reference picture corresponding to the POC information element immediately previous to the POC information element of the target reference picture.

At this time, the sign of the POC difference may be a sign of a difference between the POC value of the target reference picture and the POC value of the current picture.

The POC information elements available in the reference picture information may include information indicates the magnitude of a POC difference between a target reference picture and a criterion picture out of the reference pictures indicated by the reference picture information; the number of reference pictures when the sign of the POC difference is negative; and the number of reference pictures when the sign of the POC difference is positive, and the POC information elements of the reference pictures in the reference picture information may be arranged on the basis of the POC value of the target reference picture.

At this time, the sign of the POC difference may be a sign of a difference between the POC value of the target reference picture and the POC value of the current picture.

In addition, the POC information elements in the reference picture information may be arranged in a POC descending order of reference pictures for the reference pictures previous to the current picture in the POC order and may be arranged in a POC ascending order of reference pictures for the reference pictures subsequent to the current picture in the POC order. When the target reference picture is any one of the picture closest to the current picture out of the pictures previous to the current picture in the POC order and the picture closest to the current picture out of the pictures subsequent to the current picture in the POC order in the reference pictures indicated by the reference picture information, the criterion picture may be the current picture. When the target reference picture is not any one of the picture closest to the current picture out of the pictures previous to the current picture in the POC order and the picture closest to the current picture out of the pictures subsequent to the current picture in the POC order in the reference pictures indicated by the reference picture information, the criterion picture may be the reference picture corresponding to the POC information element immediately previous to the POC information element of the target reference picture.

According to another aspect of the present invention, there is provided a method of decoding video information, including the steps of entropy-decoding information of a received bitstream and obtaining reference picture information including picture order count (POC) information elements of reference pictures available in prediction of a current picture; and performing a prediction on the current block using a reference picture list which is constructed on the basis of POC values of the reference pictures derived from the reference picture information, wherein the POC information elements of the available reference pictures in the reference picture information are arranged so that POC values of pictures previous to the current picture in an POC order are located in front and POC values of pictures subsequent to the current picture in the POC order are located subsequently.

The POC information elements in the reference picture information may be arranged in a POC descending order of reference pictures for the reference pictures previous to the current picture in the POC order.

The POC information elements in the reference picture information may be arranged in a POC ascending order of reference pictures for the reference pictures subsequent to the current picture in the POC order.

The i-th (where i is an integer) POC information element POCi in the reference picture information may be a POC information of a reference picture Pi, the POCi may include the magnitude of a POC difference between the reference picture Pi and a criterion picture in the reference picture information, and the POC information elements of the reference pictures in the reference picture information may be arranged on the basis of the POC values of the reference pictures.

At this time, the POC information elements in the reference picture information may be arranged in a POC descending order of reference pictures for the reference pictures previous to the current picture in the POC order and may be arranged in a POC ascending order of reference pictures for the reference pictures subsequent to the current picture in the POC order. When the reference picture Pi is any one of the picture closest to the current picture out of the pictures previous to the current picture in the POC order and the picture closest to the current picture out of the pictures subsequent to the current picture in the POC order in the reference pictures indicated by the reference picture information, the criterion picture may be the current picture. When the reference picture Pi is not any one of the picture closest to the current picture out of the pictures previous to the current picture in the POC order and the picture closest to the current picture out of the pictures subsequent to the current picture in the POC order in the reference pictures indicated by the reference picture information, the criterion picture may be the reference picture corresponding to the POC information element immediately previous to the POC information element of the target reference picture.

In addition, the POC information elements may include information indicating the sign of a POC difference between the reference picture and the current picture.

The i-th (where i is an integer) POC information element POCi in the reference picture information may be a POC information element of a reference picture Pi, the POCi may include the magnitude of a POC difference between the reference picture Pi and a criterion picture in the reference picture information, and the POC information elements of the reference pictures in the reference picture information may be arranged on the basis of the POC values of the reference pictures.

At this time, the POC information elements in the reference picture information may be arranged in a POC descending order of reference pictures for the reference pictures previous to the current picture in the POC order and may be arranged in a POC ascending order of reference pictures for the reference pictures subsequent to the current picture in the POC order. When the reference picture Pi is any one of the picture closest to the current picture out of the pictures previous to the current picture in the POC order and the picture closest to the current picture out of the pictures subsequent to the current picture in the POC order in the reference pictures indicated by the reference picture information, the criterion picture may be the current picture. When the reference picture Pi is not any one of the picture closest to the current picture out of the pictures previous to the current picture in the POC order and the picture closest to the current picture out of the pictures subsequent to the current picture in the POC order in the reference pictures indicated by the reference picture information, the criterion picture may be the reference picture corresponding to the POC information element immediately previous to the POC information element of the target reference picture.

The reference picture information may include information indicating an order relationship between the POC value of each reference picture and the POC value of the current picture.

The POC information elements may include POC difference information and sign information. When the number of reference pictures previous to the current picture in the POC order out of m reference pictures indicated by the reference picture information is n, the POC difference value for the reference picture k corresponding to the k-th (where 0≤k≤n−1) POC difference information element POCk out of the POC difference information may be a difference between the POC value of a first criterion picture and the POC information element POCk, and the POC difference value of the reference picture j corresponding to the j-th (where nm) POC difference information POCj out of the POC difference information elements may be the sum of the POC value of a second criterion picture and the POC difference information element POCj.

At this time, the first criterion picture may be the current picture when k is equal to 0, the first criterion picture may be the reference picture corresponding to the (k−1)-th POC difference information element when k is not equal to 0, the second criterion picture may be the current picture when j is equal to n, and the second criterion picture may be the reference picture corresponding to the (n−1)-th POC difference information element when j is not equal to n.

Advantageous Effects

According to the present invention, it is possible to effectively signal video information in encoding/decoding the video information.

According to the present invention, it is possible to effectively signal information for constructing a reference picture list used to perform an inter prediction.

According to the present invention, it is possible to reduce transmission overheads in transmitting information for constructing a reference picture list.

According to the present invention, it is possible to effectively construct a reference picture list for inter prediction on the basis of information received information with low complexity.

DESCRIPTION OF EMBODIMENTS

Figure 1:
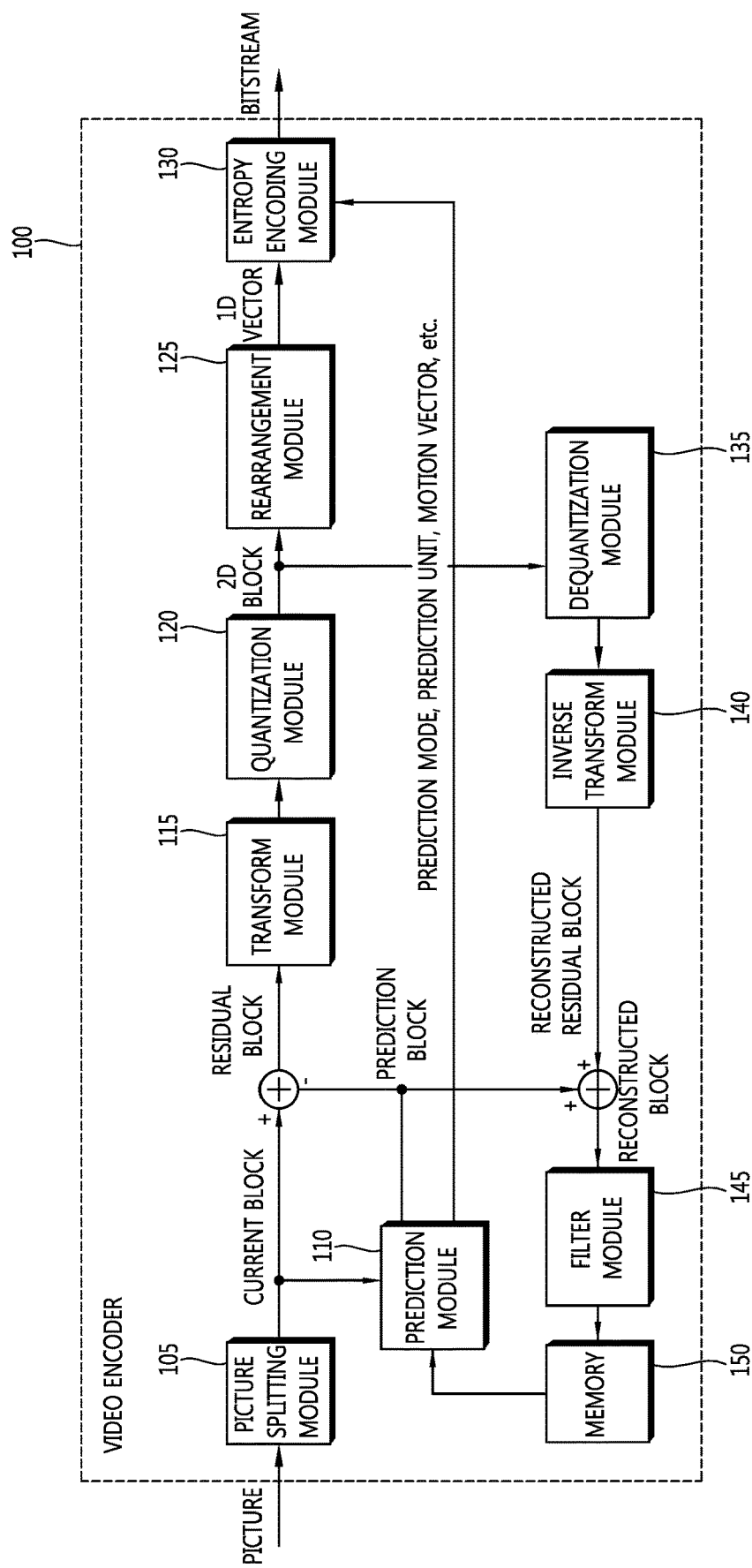
FIG. 1 is a block diagram schematically illustrating a video encoder according to an embodiment of the present invention.

The invention may be variously modified in various foams and may have various embodiments, and specific embodiments thereof will be illustrated in the drawings and described in detail. However, these embodiments are not intended for limiting the invention. Teams used in the below description are used to merely describe specific embodiments, but are not intended for limiting the technical spirit of the invention. An expression of a singular number includes an expression of a plural number, so long as it is clearly read differently. Terms such as "include" and "have" in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions in a video encoder and a video decoder, and do not mean that the elements are embodied by independent hardware or independent software. For example, two or more elements out of the elements may be combined to form a single element, or one element may be split into plural elements. Embodiments in which the elements are combined and/or split belong to the scope of the invention without departing from the concept of the invention.

Hereinafter, exemplary embodiments of the invention will be described in detail with reference to the accompanying drawings. The same elements in the drawings will be referenced by the same reference signs and the description of the same elements will not be repeated.

FIG. 1 is a block diagram schematically illustrating a video encoder according to an embodiment of the present invention. Referring to FIG. 1, a video encoder 100 includes a picture splitting module 105, a prediction module 110, a transform module 115, a quantization module 120, a rearrangement module 125, an entropy encoding module 130, a dequantization module 135, an inverse transform module 140, a filter module 145, and a memory 150.

The picture splitting module 105 may split an input picture into at least one process unit. Here, the process unit may be a prediction unit (hereinafter, referred to as a "PU"), a transform unit (hereinafter, referred to as a "TU"), or a coding unit (hereinafter, referred to as a "CU").

As will be described later, the prediction module 110 includes an inter prediction module that performs an inter prediction and an intra prediction module that performs an intra prediction. The prediction module 110 may perform a prediction on the process unit of the picture split by the picture splitting module 105 to generate a predicted block. The process unit of a picture in the prediction module 110 may be a CU, a TU, or a PU. It may be determined whether the prediction performed on the corresponding process unit is an inter prediction or an intra prediction, and specific details (for example, a prediction mode) of the prediction methods may be determined. The process unit subjected to the prediction may be different from the process unit of which the prediction method and the specific details are determined. For example, the prediction method and the prediction mode may be determined in the units of PU and the prediction may be performed in the units of TU.

In the inter prediction, a prediction may be performed on the basis of information on at least one of a previous picture and/or a subsequent picture of a current picture to generate a predicted block. In the intra prediction, a prediction may be performed on the basis of pixel information of a current picture to generate a predicted block.

A skip mode, a merge mode, a motion vector prediction (MVP), or the like may be used as the intra prediction method. In the inter prediction, a reference picture may be selected for a PU, and a reference block having the same size as the PU may be selected. The reference block may be selected in the unit of integer pixels. A predicted block may be generated so that a residual signal from a current PU is minimized and the magnitude of a motion vector is minimized.

The predicted block may be generated in the unit of integer pixel samples or in the unit of pixel samples less than an integer pixel, such as ½ pixel samples and ¼ pixel samples. Here, a motion vector may also be expressed in the unit of pixel samples less than an integer pixel. For example, luma pixels may be expressed in the unit of ¼ pixels and chroma pixels may be expressed in the unit of ⅛ pixels.

Information such as an index of a reference picture selected through the inter prediction, a motion vector (for example, a motion vector predictor), and a residual signal may be entropy-encoded and transmitted to a video decoder. When the skip mode is used, the predicted block may be used as a reconstructed block and thus the residual signal may not be generated, converted, quantized, and transmitted.

When the intra prediction is performed, a prediction mode may be determined in the unit of PUs and the prediction may be performed in the unit of PUs. Alternatively, a prediction mode may be determined in the unit of PUs and the intra prediction may be performed in the unit of TUs.

The prediction modes in the intra prediction may include 33 directional prediction modes and at least two non-directional modes. The non-directional modes may include a DC prediction mode and a planar mode.

In the intra prediction, a predicted block may be generated after a filter is applied to reference samples. At this time, it may be determined whether a filter should be applied to reference samples, depending on the intra prediction mode of a current block and/or the size of the current block.

A PU may be a block having various sizes/shapes. For example, in case of the inter prediction, a PU may be a 2N×2N block, a 2N×N block, a N×2N block, or a N×N block (where N is an integer). In case of the intra prediction, a PU may be a 2N×2N block or a N×N block (where N is an integer). The PU having a block size of N×N may be set to be used in only a specific case. For example, the PU having a block size of N×N may be set to be used for only a CU having the smallest size or may be set to be used for only the intra prediction. In addition to the above-mentioned sizes, PUs such as a N×mN block, a mN×N block, a 2N×mN block, and a mN×2N block (where m<1) may be additionally defined and used.

Residual values (a residual block or a residual signal) between the generated predicted block and the original block may be input to the transform module 115. The prediction mode information, the motion vector information, and the like used for the prediction may be encoded along with the residual values by the entropy encoding module 130 and may be transmitted to the video decoder.

The transform module 115 may perform a transform on the residual block by transform units and generate transform coefficients. The transform unit in the transform module 115 may be a TU and may have a quad tree structure. The size of the transform unit may be determined within a predetermined range of largest and smallest sizes. The transform module 115 may transform the residual block using a discrete cosine transform (DCT) and/or a discrete sine transform (DST).

The quantization module 120 may quantize the residual values transformed by the transform module 115 and may generate quantization coefficients. The values calculated by the quantization module 120 may be provided to the dequantization module 135 and the rearrangement module 125.

The rearrangement module 125 may rearrange the quantization coefficients provided from the quantization module 120. By rearranging the quantization coefficients, it is possible to enhance the coding efficiency in the entropy encoding module 130. The rearrangement module 125 may rearrange the quantization coefficients in the form of a two-dimensional block to the form of a one-dimensional vector through the use of a coefficient scanning method. The rearrangement module 125 may enhance the entropy encoding efficiency in the entropy encoding module 130 by changing the coefficient scanning order on the basis of stochastic statistics of the coefficients transmitted from the quantization module.

The entropy encoding module 130 may perform an entropy encoding on the quantization coefficients rearranged by the rearrangement module 125. Examples of the entropy encoding method include an exponential golomb method, a CAVLC (Context-Adaptive Variable Length Coding) method, and a CABAC (Context-Adaptive Binary Arithmetic Coding) method. The entropy encoding module 130 may encode a variety of information such as quantization coefficient information and block type information of a CU, prediction mode information, split unit information, PU information, transfer unit information, motion vector information, reference picture information, block interpolation information, and filtering information transmitted from the rearrangement module 125 and the prediction module 110.

The entropy encoding module 130 may give a predetermined change to a parameter set or syntaxes to be transmitted, if necessary.

The dequantization module 135 dequantizes the values quantized by the quantization module 120. The inverse transform module 140 inversely transforms the values dequantized by the dequantization module 135. The residual values generated by the dequantization module 135 and the inverse transform module 140 may be merged with the predicted block predicted by the prediction module 110 to derive a reconstructed block.

FIG. 1 illustrates that the residual block and the predicted block are added by an adder to generate a reconstructed block. Here, the adder may be considered as a particular module (reconstructed block constructing module) that generates a reconstructed block.

The filter module 145 may apply a deblocking filter, an adaptive loop filter (ALF), and a sample adaptive offset (SAO) to the reconstructed picture.

The deblocking filter may remove a block distortion generated at the boundary between blocks in the reconstructed picture. The ALF may perform a filtering on the basis of the resultant values of comparison of the original picture with the reconstructed picture of which the blocks have been filtered by the deblocking filter and/or the SAO. The ALF may be applied only when high efficiency is necessary. The SAO may reconstruct an offset difference of the residual block, which has been subjected to the deblocking filter, from the original image in the unit of pixels and may be applied in the form of a band offset and an edge offset.

On the other hand, the filter module 145 may not perform a filtering on the reconstructed block used in the inter prediction.

The memory 150 may store the reconstructed block or picture calculated by the filter module 145. The reconstructed block or picture stored in the memory 150 may be provided to the prediction module 110 that performs the inter prediction.

Figure 2:
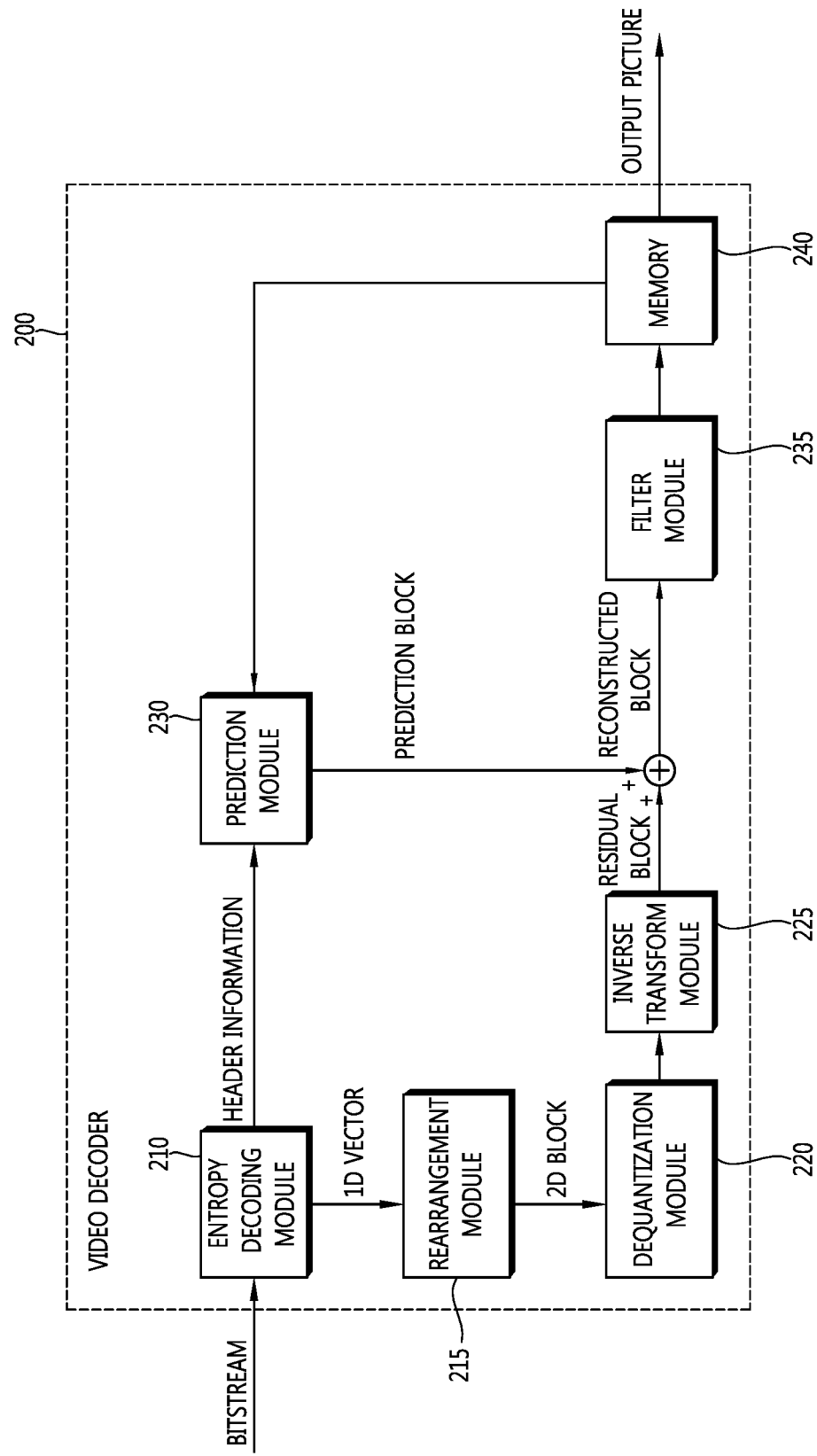
FIG. 2 is a block diagram schematically illustrating a video decoder according to an embodiment of the present invention.

FIG. 2 is a block diagram schematically illustrating a video decoder according to an embodiment of the present invention. Referring to FIG. 2, a video decoder 200 may include an entropy decoding module 210, a rearrangement module 215, a dequantization module 220, an inverse transform module 225, a prediction module 230, a filter module 235, and a memory 240.

When a video bitstream is input from the video encoder, the input bitstream may be decoded on the basis of the order in which video information is processed by the video encoder.

For example, when the video encoder uses a variable length coding (hereinafter, referred to as "VLC") method such as the CAVLC method to perform the entropy encoding, the entropy decoding module 210 may implement the same VLC table as the VLC table used in the video encoder and may perform the entropy decoding. When the video encoder uses the CABAC method to perform the entropy encoding process, the entropy decoding module 210 may perform the entropy decoding using the CABAC method to correspond thereto.

Information for generating a predicted block out of the information decoded by the entropy decoding module 210 may be provided to the prediction module 230, and the residual values entropy-decoded by the entropy decoding module 210 may be input to the rearrangement module 215.

The rearrangement module 215 may rearrange the bitstream entropy-decoded by the entropy decoding module 210 on the basis of the rearrangement method in the video encoder. The rearrangement module 215 may reconstruct and rearrange coefficients expressed in the form of a one-dimensional vector into coefficients in the form of a two-dimensional block. The rearrangement module 215 may be provided with information associated with the coefficient scanning performed by the video encoder and may perform the rearrangement using a method of inversely scanning the coefficients on the basis of the scanning order in which the scanning is performed by the video encoder.

The dequantization module 220 may perform dequantization on the basis of the quantization parameters provided from the video encoder and the coefficient values of the rearranged block.

The inverse transform module 225 may perform the inverse DCT and/or inverse DST of the DCT and/or DST, which has been performed by the transform module of the video encoder, on the quantization result from the video encoder. The inverse transform may be performed on the basis of a transfer unit or a split unit of a picture determined by the video encoder. The transform module of the video encoder may selectively perform the DCT and/or DST depending on plural information elements such as the prediction method, the size of a current block, and the prediction direction, and the inverse transform module 225 of the video decoder may perform the inverse transform on the basis of the transform information on the transform performed by the transform module of the video encoder.

The prediction module 230 may generate a predicted block on the basis of prediction block generation information provided from the entropy decoding module 210 and the previously-decoded block and/or picture information provided from the memory 240.

When the prediction mode of a current PU is an intra prediction mode, the prediction module 230 may perform an intra prediction of deriving a predicted block on the basis of pixel information of a current picture.

When the prediction mode for a current PU is the inter prediction mode, the prediction module 230 may perform the inter prediction on the current PU on the basis of information included in at least one of a previous picture and a subsequent picture of the current picture. At this time, motion information for the inter prediction of the current PU, for example, information on motion vectors and reference picture indices, provided from the video encoder may be derived from a skip flag, a merge flag, and the like received from the video encoder.

The reconstructed block may be derived using the predicted block generated by the prediction module 230 and the residual block provided from the inverse transform module 225. FIG. 2 illustrates that the residual block and the predicted block are added by an adder to derive a reconstructed block. Here, the adder may be considered as a particular module (reconstructed block constructing module) that generates a reconstructed block.

When the skip mode is used, the residual signal may not be transmitted and the predicted block may be used as a reconstructed block.

The reconstructed block and/or picture may be provided to the filter module 235. The filter module 235 may perform a deblocking filtering, an SAO, and/or an ALF on the reconstructed block and/or picture.

The memory 240 may store the reconstructed picture or block for use as a reference picture or a reference block and may provide the reconstructed picture to an output module.

Encoded or decoded pictures may be stored in a memory such as a decoded picture buffer (DPB). When a current picture is encoded or decoded, the previous pictures stored in the DPB may be referred to for performing a prediction on the current picture.

Specifically, the video encoder and the video decoder may stored a list of the previously-encoded/decoded pictures as a reference picture list for use in the inter prediction.

When the inter prediction is performed, the video encoder and the video decoder may perform a prediction on a target block (current block) of a current picture by referring another picture. The inter prediction may be performed by the prediction modes of the video encoder and the video decoder as illustrated in FIGS. 1 and 2.

When the inter prediction is performed, as described above, the prediction may be performed on the current block using information of available neighboring blocks adjacent to the current block. Here, the neighboring blocks may include a available block out of blocks located at the same position (co-located) with the current block in reference pictures, which can be referred to by the current block (hereinafter, the available block referred to as "Col block" (co-located block) for the purpose of convenience of explanation).

A neighboring block used to perform a prediction on the current block in the inter prediction is referred to as "candidate block" for the purpose of convenience of explanation.

In the inter prediction, the prediction may be performed on the current block on the basis of information of candidates blocks. In case of the skip mode or the merge mode, motion information (for example, motion vector) and/or a reference picture for a block selected from the candidate blocks may be used as the motion information and/or the reference picture for the current block.

When the MVP is performed, the motion information (for example, motion vector) for a block selected from candidates blocks may be used as a predicted value of a motion vector for the current block, and the reference picture information for the current block may be transmitted from the video encoder to the video decoder. A motion vector difference (MVD) between the MVP derived from the candidate block and the motion vector for the current block may be transmitted from the video encoder to the video decoder, and the prediction module of the video decoder may derive the motion information for the current block on the basis of the MVP and the MVD.

Figure 3:
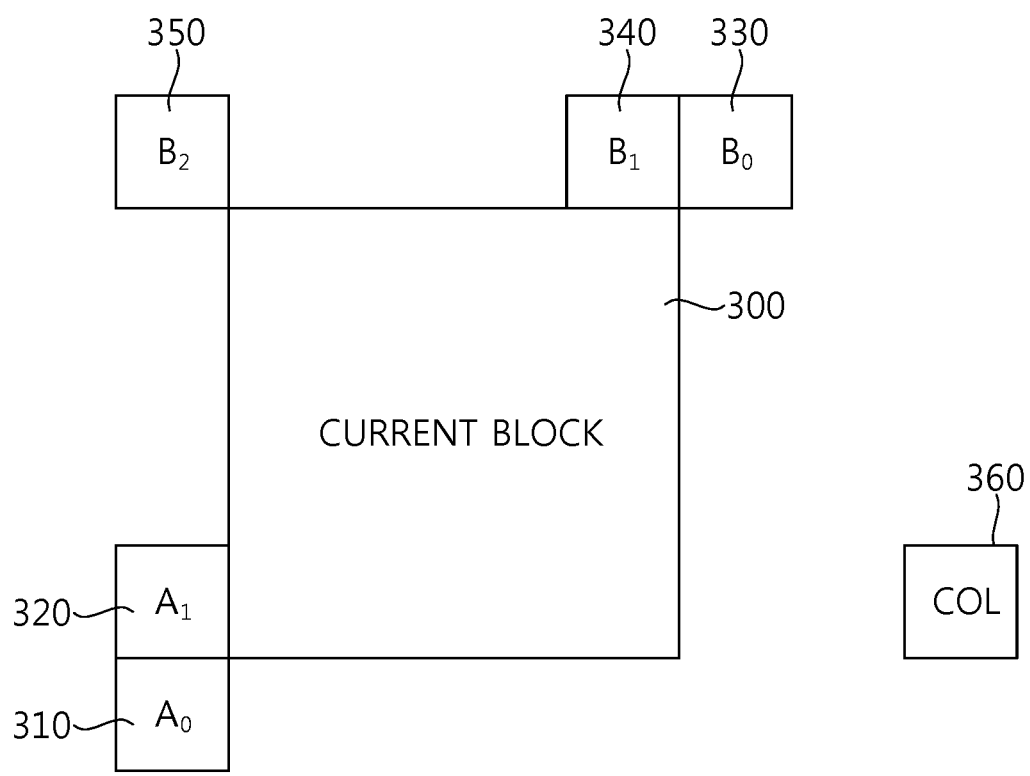
FIG. 3 is a diagram schematically illustrating examples of a candidate block which can be used to perform an inter prediction on a current block.

FIG. 3 is a diagram schematically illustrating an example of candidate blocks which can be used when the inter prediction is performed on a current block.

The prediction modules of the video encoder and the video decoder may use a block located at a predetermined position around a current block 400 as a candidate block. For example, in the example of FIG. 3, two blocks $A_0$ 410 and $A_1$ 420 located on the left-bottom side of the current block and three blocks $B_0$ 430, $B_1$ 440, and $B_2$ 450 located on the right-top side and the left-top side of the current block may be selected as spatial candidate blocks. In addition to the blocks spatially neighboring, the Col block 460 may be used as a temporal candidate block.

At the time of performing the inter prediction, as described above, the motion information of the current block may use motion information of a selected block out of the neighboring blocks as it is or may be derived on the basis of the motion information of the selected block out of the neighboring blocks.

On the other hand, regarding reference pictures used for the inter prediction, reference pictures for the current blocks may be derived from reference pictures of neighboring blocks or may be indicated by information received from the video encoder. In case of the skip mode or the merge mode, the prediction module of the video decoder may use the reference pictures of the neighboring blocks as the reference pictures for the current block. When the MVP is applied, the prediction module of the video decoder may receive the information indicating the reference pictures for the current block from the video encoder.

Pictures encoded/decoded previously to the current picture may be stored in a memory (for example, a decoded picture buffer (DPB)) and may be used for prediction of the current block (current picture). A list of pictures which are available for the inter prediction of the current block may be stored as a reference picture list.

A P slice is a slice which is decoded through the intra prediction or the inter prediction using at most one motion vector and a reference picture. A B slice is a slice which is decoded through the intra prediction or the inter prediction using at most two motion vectors and two reference pictures. Here, reference pictures may include a short-team reference picture and a long-term reference picture.

Reference picture list 0 (hereinafter, referred to as "L0" for the purpose of convenience of explanation) is a reference picture list used for the inter prediction of a P slice or a B slice. Reference picture list 1 (hereinafter, referred to as "L1" for the purpose of convenience of explanation) is used for the inter prediction of a B slice. Therefore, L0 may be used for the inter prediction of a block of a P slice using uni-directional prediction, and L0 and L1 may be used for the inter prediction of a block of a B slice using bi-directional prediction.

The video decoder may construct a reference picture list when a decoding is performed on a P slice and a B slice through the use of inter prediction. A reference picture to be used for the inter prediction may be indicated based on a reference picture list. A reference picture index is an index indicating a reference picture in the reference picture list.

The reference picture list may be constructed on the basis of a reference picture set transmitted from the video encoder.

The reference pictures constituting the reference picture list may be stored in a memory (for example, DPB).

The pictures (pictures encoded/decoded previously to a current picture) stored in the memory may be managed by the video encoder and the video decoder. The video encoder and the video decoder store pictures necessary for prediction of the current block and releases pictures not used for prediction of the current block from the memory.

When a sliding window method is used as the method of managing the reference pictures, the reference pictures may be managed by a simple method of releasing a reference picture in a predetermined time passes after the reference picture is stored in the memory, but this method has several problems. For example, since there is a reference picture which is not available any more, the reference picture may not be released from the memory and thus efficiency may be lowered. Since a stored reference picture is released from the memory after a predetermined time, it may be difficult to manage long-term reference pictures.

A memory management command operation (MMCO) method of directly signaling instruction information on management of reference pictures from the video encoder may be used in consideration of the problems of the sliding window method. However, even when the MMCO method is used, a picture loss may occur in the course of signaling. When a lost picture includes an MMCO command, the lost MMCO information may not be reconstructed and the memory (DPB) may not be maintained in a state where currently-necessary pictures are correctly managed. Therefore, there is a possibility that the inter prediction will be performed incorrectly.

In order to solve the above-mentioned problems, a method of transmitting, at each of slice header, a list of reference pictures necessary in the course of decoding a slice may be used. A kind of abstract container including a list of reference pictures in the slice header may be referred to as "RefPicList". Alternatively, as described above, in order to distinguish reference picture list 0 and reference picture list 1 constructed by the video decoder, the list of reference pictures necessary in the course of decoding a slice may be referred to as a reference picture set.

A reference picture set or RefPicList (hereinafter, referred to as a "reference picture set" for the purpose of convenience of explanation and distinction from the reference picture list) may include reference pictures to be used for reference of a current picture/slice or a future picture/slice. For example, a reference picture set is information transmitted from a video encoder to the video decoder and pictures included in the reference picture set may be specified by picture order count (POC). The POC indicates a display order of a picture. At this time, the POCs for the reference pictures in the reference picture set may be relative POCs to the POC of a current picture.

The relative POC represents a POC difference between two pictures in the reference picture set. The relative POC of the reference picture previous to the current picture in the POC order (reference picture having a POC smaller than the POC of the current picture) is POC difference from the immediately-previous reference picture in the reference picture set. The relative POC of the reference picture previous to the current picture in the POC order (reference picture having a POC larger than the POC of the current picture) is a POC difference from the immediately-previous reference picture in the reference picture set. Here, in case of (1) the first reference picture in the reference picture set and (2) the reference picture having a relative POC of which the sign is different from that of the previous reference picture in the reference picture set, the magnitude of the relative POC is POC difference from the current picture.

The POC difference between two pictures in the reference picture set may be expressed by the absolute value and the sign.

The reference picture set may be signaled from the video encoder to the video decoder for each P slice and for each B slice.

Reference picture lists L0 and L1 may be constructed on the basis of the reference picture set received from the video encoder or may be explicitly transmitted from the video encoder.

When reference picture list L0 is constructed, among pictures having a POC smaller than the POC of the current picture out of the pictures (pictures previous to the current picture in the POC order or the pictures of which the relative POC has a negative sign) and pictures having a POC larger than the POC of the current picture in the received reference picture set (pictures subsequent to the current picture in the POC order or the pictures of which the relative POC has a positive sign), reference picture indices are first allocated to the POC smaller than the POC of the current picture, whereby a reference picture list is constructed.

For example, until all the reference picture indices constituting the reference picture list are allocated, (i) lower reference picture indices are allocated to the pictures closer to the current picture in the POC order, for the pictures having a POC smaller than the POC of the current picture in the reference picture set for the current picture/slice, and then (ii) lower reference picture indices are allocated to the pictures closer to the current picture in the POC order, for the pictures having a POC larger than the POC of the current picture in the reference picture set for the current picture/slice.

When reference picture list L1 is constructed, among pictures having a POC smaller than the POC of the current picture out of the pictures (pictures previous to the current picture in the POC order or the pictures of which the relative POC has a negative sign) and pictures having a POC larger than the POC of the current picture in the received reference picture set (pictures subsequent to the current picture in the POC order or the pictures of which the relative POC has a positive sign), reference picture indices are first allocated to the pictures having a POC larger than the POC of the current picture, whereby a reference picture list is constructed.

For example, until all the reference picture indices constituting the reference picture list are allocated, (i) lower reference picture indices are allocated to the pictures closer to the current picture in the POC order, for the pictures having a POC larger than the POC of the current picture in the reference picture set for the current picture/slice, and then (ii) lower reference picture indices are allocated to the pictures closer to the current picture in the POC order, for the pictures having a POC smaller than the POC of the current picture in the reference picture set for the current picture/slice.

Here, the short-term reference pictures are exemplified, but in case of a reference picture list including long-term reference pictures, reference picture lists L0 and L1 may be first subjected to the processes of (i) and (ii) and then pictures transmitted as the long-term reference pictures through the reference picture set may be added thereto.

In this specification, a method of constructing a reference picture set of short-term reference pictures and constructing a reference picture list will be described below. A reference picture in the below description may mean a short-term reference picture.

At this time, in order to reduce the number of bits of the signaled reference picture set and to reduce complexity of the process of constructing a reference picture list in the video decoder, the reference pictures (information of the reference pictures, for example, POC values) in the reference picture set (a list of reference pictures) may be arranged and transmitted.

The reference pictures in the reference picture set are signaled in a state where (1) the reference pictures having a POC smaller than the POC of the current picture are arranged (ordered) in the beginning part of the reference picture set in the POC descending order, and then (2) the reference pictures having a POC larger than the POC of the current picture are arranged subsequently thereto in the POC ascending order.

For example, in the reference picture set, the reference pictures (information elements of pictures) having a POC smaller than the POC of the current picture are first arranged and then the reference pictures (information elements of pictures) having a POC larger than the POC of the current picture are arranged. Here, the arranged information elements of the reference pictures may be the POCs of the reference pictures, or the relative POCs of the reference pictures, or the magnitudes and signs of the relative POCs of the reference pictures.

When the arranged information elements are the POCs of the reference pictures, the POCs of the reference pictures having a POC smaller than the POC of the current picture are arranged in the order getting apart from the POC of the current picture in the reference picture set and then the POCs of the reference pictures having a POC larger than the POC of the current picture are arranged in the order getting apart from the POC of the current picture.

When the arranged information elements are the relative POCs of the reference pictures, the relative POCs of the reference pictures having a POC smaller than the POC of the current picture may be first arranged and the relative POCs of the reference pictures having a POC larger than the POC of the current picture may be arranged subsequently thereto. For example, the relative POCs of the reference pictures having a POC smaller than the POC of the current picture in the reference picture set are arranged in the POC order (descending order) of the reference pictures, and the relative POCs of the reference pictures having a POC larger than the POC of the current picture are subsequently arranged in the POC order (ascending order) of the reference pictures. Here, the relative POC of the reference picture is difference value between the POC of the current picture and the POC of the reference picture.

A relative POC in the reference picture set may be represented by the magnitude (absolute value) of the relative POC and the sign of the relative POC.

The sign of the relative POC of a reference picture indicates whether the reference picture is located previous or subsequent to the current picture in the POC order. Therefore, instead of transmitting information specifically indicating the sign (+ or −) of the relative POC, the magnitudes of the relative POCs of the reference pictures previous to the current picture in the POC order may be first transmitted and the magnitudes of the relative POCs of the reference pictures subsequent to the current picture may then be transmitted. The video decoder receiving the reference picture set may determine that the magnitudes of the relative POCs first received are associated with the reference pictures previous to the current picture in the POC order and the magnitudes of the relative POCs subsequently received are associated with the reference pictures subsequent to the current picture in the POC order. At this time, information indicating the number of reference pictures previous to the current picture in the POC order and the number of reference pictures subsequent to the current picture in the POC order may be transmitted with information on the magnitudes.

When the magnitudes of the relative POCs are transmitted, in the reference picture set, the magnitudes of the relative POCs of the reference pictures having a POC smaller than the POC of the current picture are arranged in the POC order (descending order) of the reference pictures, and the magnitudes of the relative POCs of the reference pictures having a POC larger than the POC of the current picture are arranged in the POC order (ascending order) of the reference pictures.

Table 1 shows an example of a method of determining the magnitudes and the signs of the relative POCs in the video encoder.

TABLE 1 sign_ref_pic[i] = (ref_pic[i] − currentPOC > 0)  ?  +  :  −
if (i > 0 && sign_ref_pic[i] == sign_ref_pic[i−1]), then,
abs_ref_pic[i] = |ref_pic[i] − refValue| − |ref_pic[i−1] − refValue|
else,
abs_ref_pic[i] = |ref_pic[i] − refValue|

The video encoder may determine the magnitudes and the signs of the relative POCs of the reference pictures to be signaled through the use of the reference picture set using the method shown in Table 1.

Here, sign_ref_pic[i] specifies the sign of the relative POC for the i-th reference picture in the reference picture set. When the POC of the i-th reference picture (ref_pic[i]) is larger than the POC of the current picture (currentPOC), the value of the sign sign_ref_pic[i] of the relative POC for the i-th reference picture indicates "+". When the POC of the i-th reference picture (ref_pic[i]) is not larger than the POC of the current picture (currentPOC), the value of the sign sign_ref_pic[i] of the relative POC for the i-th reference picture indicates "−".

abs_ref_pic[i] specifies the magnitude of the relative POC for the i-th reference picture in the reference picture set. When the sign of the relative POC for the i-th reference picture is equal to the sign of the relative POC for the (i−1)-th reference picture, a difference value between the difference between the POC of the i-th reference picture and a reference value (refValue) and the difference between the POC of the (i−1)-th reference picture and the reference value (refValue) is the magnitude of the relative POC for the i-th reference picture. That is, when the sign of the relative POC for the i-th reference picture is equal to the sign of the relative POC for the (i−1)-th reference picture, the magnitude of the relative POC for the i-th reference picture is a POC difference between neighboring reference pictures (a difference between the POC of the i-th reference picture and the POC of the (i−1)-th reference picture) in the reference picture set.

The reference value (refValue) is a POC value transmitted from the video encoder or set in advance and is a reference POC value for deriving the first relative POC in the reference picture set. For example, the reference value (refValue) may be the POC value of the current picture.

The sign of the relative POC for the i-th reference picture may not be equal to the sign of the relative POC for the (i-t)-th reference picture. This case is a case where the i-th reference picture in the reference picture set is the first picture or a case where the (i−1)-th reference picture in the reference picture set is a picture previous to the current picture in the POC order and the i-th reference picture is a picture subsequent to the current picture in the POC order. Therefore, when the sign of the relative POC for the i-th reference picture is not equal to the sign of the relative POC for the (i−1)-th reference picture, the magnitude of the relative POC for the i-th reference picture may be the difference between the POC of the i-th reference picture and the reference value (refValue). Subsequently, since the sign of the relative POC for the (i+1)-th reference picture is equal to the sign of the relative POC for the i-th reference picture, the magnitude of the relative POC for the (i+1)-th reference picture is the difference between the POC of the (i+1)-th reference picture and the POC of the i-th reference picture.

The video encoder may transmit the magnitudes and the signs of the relative POCs for the reference pictures derived as described above as the reference picture set. While, in transmitting the magnitudes of the relative POCs for the reference pictures, the video encoder may first transmit the magnitudes of the relative POCs for the reference pictures previous to the current picture in the POC order and then may transmit the magnitudes of the relative POCs for the reference pictures subsequent to the current picture. In this case, the video encoder may transmit information indicating the number of reference pictures of which sign of the relative POC is "−" (the numbers of pictures previous to the current picture in the POC order) and the number of reference pictures of which the sign of the relative POC is "+" (the number of pictures subsequent to the current picture in the POC order).

Table 2 shows another example of a method of determining the magnitudes and the signs of the relative POCs in the video encoder.

TABLE 2 sign_ref_pic[i] = (ref_pic[i] − currentPOC > 0)  ?  +  :  −
if (i > 0 && sign_ref_pic[i] == sign_ref_pic[i−1]), then,
abs_ref_pic[i] = |ref_pic[i] − currentPOC| −
|ref_pic[i−1] − currentPOC|
else,
abs_ref_pic[i] = |ref_pic[i] − currentPOC|

In Table 2, a case that the reference value (refValue) is the POC value of the current picture is explained as an example.

Similarly to Table 1, when the POC of the i-th reference picture (ref_pic[i]) is larger than the POC of the current picture (currentPOC), the value of the sign sign_ref_pic[i] of the relative POC for the i-th reference picture indicates "+". When the POC of the i-th reference picture (ref_pic[i]) is not larger than the POC of the current picture (currentPOC), the value of the sign sign_ref_pic[i] of the relative POC for the i-th reference picture indicates "−".

When the sign of the relative POC for the i-th reference picture is equal to the sign of the relative POC for the (i−1)-th reference picture, a difference value between the difference between the POC of the i-th reference picture and the POC of the current picture and the difference between the POC of the (i−1)-th reference picture and the POC of the current picture is the magnitude of the relative POC for the i-th reference picture. That is, when the sign of the relative POC for the i-th reference picture is equal to the sign of the relative POC for the (i−1)-th reference picture, the magnitude of the relative POC for the i-th reference picture is a POC difference between neighboring reference pictures (a difference between the POC of the i-th reference picture and the POC of the (i−1)-th reference picture) in the reference picture set.

The sign of the relative POC for the i-th reference picture may not be equal to the sign of the relative POC for the (i−1)-th reference picture. This case is a case where the i-th reference picture in the reference picture set is the first picture or a case where the (i−1)-th reference picture in the reference picture set is a picture previous to the current picture in the POC order and the i-th reference picture is a picture subsequent to the current picture in the POC order. Therefore, when the sign of the relative POC for the i-th reference picture is not equal to the sign of the relative POC for the (i−1)-th reference picture, the magnitude of the relative POC for the i-th reference picture may be the difference between the POC of the i-th reference picture and the POC of the current picture. Subsequently, since the sign of the relative POC for the (i+1)-th reference picture is equal to the sign of the relative POC for the i-th reference picture, the magnitude of the relative POC for the (i+1)-th reference picture is the difference between the POC of the (i+1)-th reference picture and the POC of the i-th reference picture.

The video encoder may transmit the magnitudes and the signs of the relative POCs for the reference pictures derived as described above as the reference picture set. While, in transmitting the magnitudes of the relative POCs of the reference pictures, the video encoder may first transmit the magnitudes of the relative POCs for the reference pictures previous to the current picture in the POC order and then may transmit the magnitudes of the relative POCs for the reference pictures subsequent to the current picture. In this case, the video encoder may transmit information indicating the number of reference pictures of which sign of the relative POC is "−" (pictures previous to the current picture in the POC order) and the number of reference pictures of which the sign of the relative POC is "+" (pictures subsequent to the current picture in the POC order).

The video decoder may receive information on the reference picture set from the video encoder and may construct or reconstruct the reference picture set on the basis of the received information.

Table 3 shows an example of a method of recovering the information (POCs) of the reference pictures in the video decoder receiving the reference picture set.

TABLE 3 if (i > 0 && sign_ref_pic[i] == sign_ref_pic[i−1]), then,
   if (sign_ref_pic[i] == −), then
      ref_pic[i] = refValue − Σabs_ref_pic[i]
   else,
      ref_pic[i] = refValue + Σabs_ref_pic[i]
else,
   if (sign_ref_pic[i] == −), then
      ref_pic[i] = refValue − abs_ref_pic[i]
   else,
      ref_pic[i] = refValue + abs_ref_pic[i]

The video decoder may reconstruct the POCs available in prediction of the current block (picture) using the method shown in Table 3 on the basis of the reference picture information (the magnitude of the relative POC or the magnitude and the sign of the relative POC) received from the video encoder.

The POC of the i-th reference picture (ref_pic[i]) in the reference picture set may be reconstructed on the basis of the magnitude (abs_ref_pic[i]) and the sign (sign_ref_pic[i]) of the relative POC for the i-th reference picture.

As shown in Table 3, the video decoder may explicitly receive the sign of the relative POC and may recover the POC of the reference picture When the sign of the i-th reference picture and the sign of the (i−1)-th reference picture in the reference picture set are equal to each other and the sign of the i-th reference picture is "−", the POC of the i-th reference picture is a value obtained by subtracting the sum of the relative POCs from the initial reference picture (0-th reference picture) to the i-th reference picture from the reference value (refValue). When the sign of the i-th reference picture and the sign of the (i−1)-th reference picture in the reference picture set are equal to each other and the sign of the i-th reference picture is "+", the POC of the i-th reference picture is a value obtained by adding the sum of the relative POCs from the initial reference picture (0-th reference picture) to the i-th reference picture to the reference value (refValue).

Here, the reference value (refValue) is a POC value transmitted from the video encoder or set in advance and is a reference POC value for deriving the first relative POC in the reference picture set. For example, the reference value (refValue) may be the POC value of the current picture.

When the sign of the i-th reference picture in the reference picture set is not equal to the sign of the (i−1)-th reference picture, this case means a case where the i-th reference picture in the reference picture set is the first picture or a case where the (i−1)-th reference picture in the reference picture set is a picture previous to the current picture in the POC order and the i-th reference picture is a picture subsequent to the current picture in the POC order.

When the sign of the i-th reference picture and the sign of the (i−1)-th reference picture in the reference picture set are not equal to each other and the sign of the i-th reference picture is "−", the POC of the i-th reference picture is a value obtained by subtracting the relative POC for the i-th reference picture from the reference value (refValue). When the sign of the i-th reference picture and the sign of the (i−1)-th reference picture in the reference picture set are not equal to each other and the sign of the i-th reference picture is "+", the POC of the i-th reference picture is a value obtained by adding the relative POC for the i-th reference picture to the reference value (refValue).

Unlike in the example shown in Table 2, the information indicating the signs of the relative POCs for the reference pictures may not be explicitly transmitted. In this case, the video decoder may determine that the signs of the relative POCs located in front in the reference picture set are "−" (minus) and that the signs of the relative POCs located subsequently in the reference picture set is "+" (plus). At this time, information indicating the number of relative POCs of which the sign is "−" and the number of relative POCs of which the sign is "+" may be transmitted from the video encoder. The video decoder may determine that the relative POCs corresponding to the number of relative POCs having a sign of "−" indicated by the video encoder from the beginning of the reference picture set have a sign of "−", may determine that the rest of the relative POCs have a sign of "+", and may recover the POC of the i-th reference picture (ref_pic[i]) as described above.

In other words, the relative POC for the first reference picture among the reference pictures in the reference picture set is the POC differences from the reference value (refValue). The relative POC for the picture, which is previous to the current picture, other than the first reference picture out of the reference pictures in the reference picture set is the POC difference from the immediately-previous reference picture. The relative POC for the first subsequent picture to the current picture out of the reference pictures in the reference picture set is the POC difference from the POC of the current picture. The relative POCs for the other reference pictures in the reference picture set (from the second reference picture subsequent to the current picture to the final reference picture in the reference picture set) are the POC differences from the immediately-previous reference picture. Here, it is determined on the basis of the POC order whether a reference picture is previous or subsequent to the current picture. The immediately-previous reference picture means a picture immediately previous in the order in the reference picture set.

Table 4 shows another example of a method of recovering the information (POCs) of the reference pictures in the video decoder receiving the reference picture set.

TABLE 4

```
if (i > 0 && sign_ref_pic[i] == sign_ref_pic[i-1]), then,
    if (sign_ref_pic[i] == -), then
        ref_pic[i] = currentPOC - (abs_ref_pic[i] +
        abs_ref_pic[i-1])
    else,
        ref_pic[i] = currentPOC + (abs_ref_pic[i] +
        abs_ref_pic[i+1])
else,
    if (sign_ref_pic[i] == -), then
        ref_pic[i] = currentPOC - abs_ref_pic[i]
    else,
        ref_pic[i] = currentPOC + abs_ref_pic[i]
```

In the method shown in Table 4, it is assumed that the number of reference pictures included in the reference picture set is 2 and the reference value (refValue) for deriving the first relative POC value in Table 3 is the POC of the current picture, in order to clearly describe the features of the present invention.

The video decoder may explicitly receive the signs of the relative POCs from the video encoder and may recover the POCs of the reference pictures.

When the sign of the i-th reference picture and the sign of the (i−1)-th reference picture in the reference picture set are equal to each other and the sign of the i-th reference picture is "−", the POC of the i-th reference picture is a value obtained by subtracting the relative POC for the i-th reference picture and the relative POC for the (i−1)-th reference picture from the POC of the current picture. When the sign of the i-th reference picture and the sign of the (i−1)-th reference picture in the reference picture set are equal to each other and the sign of the i-th reference picture is "+", the POC of the i-th reference picture is a value obtained by adding the relative POC for the i-th reference picture and the relative POC for the (i−1)-th reference picture to the POC of the current picture.

When the sign of the i-th reference picture in the reference picture set is not equal to the sign of the (i−1)-th reference picture, this case means a case where the i-th reference picture in the reference picture set is the first picture or a case where the (i−1)-th reference picture in the reference picture set is a picture previous to the current picture in the POC order and the i-th reference picture is a picture subsequent to the current picture in the POC order. In this case, the relative POC for the i-th reference picture may be derived on the basis of the POC of the current picture as shown in Table 4.

Therefore, when the sign of the i-th reference picture and the sign of the (i−1)-th reference picture in the reference picture set are not equal to each other and the sign of the i-th reference picture is "−", the POC of the i-th reference picture is a value obtained by subtracting the relative POC for the i-th reference picture from the POC of the current picture. When the sign of the i-th reference picture and the sign of the (i−1)-th reference picture in the reference picture set are not equal to each other and the sign of the i-th reference picture is "+", the POC of the i-th reference picture is a value obtained by adding the relative POC for the i-th reference picture to the POC of the current picture.

As described with reference Table 3, the information indicating the signs of the relative POCs of the reference pictures may not be explicitly transmitted. In this case, the video decoder may determine that the signs of the relative POCs located in front in the reference picture set are "−" (minus) and that the signs of the relative POCs located subsequently in the reference picture set is "+" (plus). At this time, information indicating the number of relative POCs of which the sign is "−" and the number of relative POCs of which the sign is "+" may be transmitted from the video encoder. The video decoder may determine that the relative POCs corresponding to the number of relative POCs having a sign of "−" indicated by the video encoder from the beginning of the reference picture set have a sign of "−", may determine that the rest of the relative POCs have a sign of "+", and may recover the POC of the i-th reference picture (ref_pic[i]) as described above.

In other words, the relative POCs for the first reference picture among the reference pictures in the reference picture set is the POC difference from the reference value (refValue). The relative POCs for the pictures, which are previous to the current picture, other than the first reference picture out of the reference pictures in the reference picture set are the POC differences from the immediately-previous reference picture. The relative POCs for the first subsequent picture to the current picture out of the reference pictures in the reference picture set is the POC difference from the POC of the current picture. The relative POCs for the rest of reference pictures in the reference picture set (from the second reference picture subsequent to the current picture to the final reference picture in the reference picture set) are the POC differences from the immediately-previous reference picture. Here, it may be determined on the basis of the POC order whether a reference picture is previous or subsequent to the current picture. The immediately-previous reference picture means a picture immediately previous in the order in the reference picture set.

Examples of the present invention when the reference value (refValue) is the POC of the current picture will be described specifically below.

Figure 4:
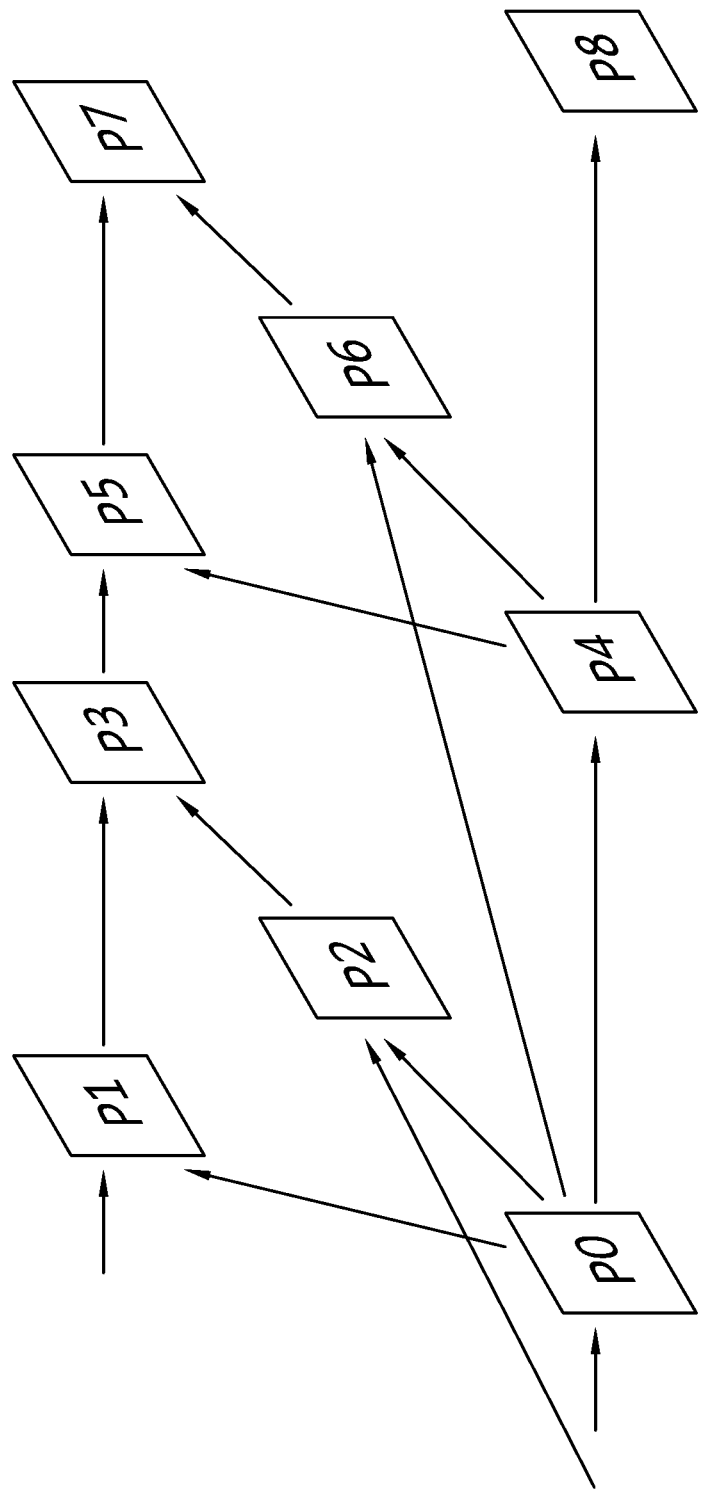
FIG. 4 is a diagram schematically illustrating an example of a reference picture set which is signaled from the video encoder to the video decoder.

FIG. 4 is a diagram schematically illustrating an example of a reference picture set which is signaled from the video encoder to the video decoder. In the example illustrated in FIG. 4, 9 P slices (P pictures) (P0 to P9) subjected to uni-directional prediction refer each other.

Table 5 shows an example where a reference picture set to be signaled in the example illustrated in FIG. 4 includes POCs of reference pictures.

TABLE 5

|  |  | current picture | | | | | | | | |
|---|---|---|---|---|---|---|---|---|---|---|
|  |  | P0 | P1 | P2 | P3 | P4 | P5 | P6 | P7 | P8 |
| POC of the current picture | | 20 | 21 | 22 | 23 | 24 | 25 | 26 | 27 | 28 |
| reference picture | i = 1 | 19 | 20 | 21 | 22 | 23 | 24 | 25 | 26 | 27 |
| set (POC) | i = 2 | 16 | 19 | 20 | 21 | 20 | 23 | 24 | 25 | 24 |
|  | i = 3 |  | 16 | 16 | 20 |  | 20 | 20 | 24 |  |

Referring to FIG. 4 and Table 5, the reference picture set of the current picture includes the POCS of the reference pictures which can be referred to for the current picture. Regarding the reference pictures in the reference picture set, lower indices are allocated to the reference pictures closer to the current picture in the POC order.

For example, in the example of FIG. 4 and Table 5, when the current picture is P6 (POC=26), the reference pictures which can be referred to for the current picture are P5, P4, and P0. Accordingly, the reference picture set of the current picture (P6) of which the POC is 26 includes the POCS of P5, P4, and P0, and lower indices are allocated to the reference pictures closer to the current picture in the POC order.

In the example of FIG. 4 and Table 5, the reference pictures previous to the current picture in the POC order are arranged in the descending order in the reference picture set, but the POCs of the reference pictures are directly signaled through the reference picture set.

Unlike this, the relative POCs for the reference pictures may be signaled through the reference picture set as described above.

Table 6 shows an example of the reference picture set to be signaled in FIG. 4, where the reference picture set includes the relative POCs for the reference pictures.

TABLE 6

|  |  | current picture | | | | | | | | |
|---|---|---|---|---|---|---|---|---|---|---|
|  |  | P0 | P1 | P2 | P3 | P4 | P5 | P6 | P7 | P8 |
| POC of the current picture | | 20 | 21 | 22 | 23 | 24 | 25 | 26 | 27 | 28 |
| reference picture | i = 1 | 19 | 20 | 21 | 22 | 23 | 24 | 25 | 26 | 27 |
| set (POC) | i = 2 | 16 | 19 | 20 | 21 | 20 | 23 | 24 | 25 | 24 |
|  | i = 3 |  | 16 | 16 | 20 |  | 20 | 20 | 24 |  |
| reference picture | i = 1 | 1 | 1 | 1 | 1 | 1 | 1 | 1 | 1 | 1 |
| set (magnitude of | i = 2 | 3 | 1 | 1 | 1 | 3 | 1 | 1 | 1 | 3 |
| relative POC) | i = 3 |  | 3 | 4 | 1 |  | 3 | 4 | 1 |  |
| reference picture | i = 1 | – | – | – | – | – | – | – | – | – |
| set (sign of relative | i = 2 | – | – | – | – | – | – | – | – | – |
| POC) | i = 3 |  | – | – | – |  | – | – | – |  |

In Table 6, the reference picture set of the current picture in FIG. 4 is expressed by the POCs of the reference pictures, the magnitude of the relative POCs for the reference pictures, and the signs of the relative POCs for the reference pictures.

Table 5 shows the case where the POCs of the reference pictures are directly transmitted, but Table 6 shows a case where the relative POCs for the reference pictures are transmitted through the reference picture set.

The relative POCs for the reference pictures previous to the current picture in the POC order (the reference pictures having a POC smaller than the POC of the current picture) are POC differences from the immediately-previous reference picture in the reference picture set. The signs of the relative POCs transmitted through the reference picture set indicate whether the corresponding reference picture is a picture previous or subsequent to the current picture in the POC order.

For example, in the example of FIG. 4 and Table 6, in consideration of a case where the current picture P5, the pictures which can be referred to for the current picture are P4, P3, and P0 and the POCs thereof are 24, 23, and 20.

When the relative POCs are transmitted through the reference picture set for P5, the reference picture set in which the magnitudes and the signs of the relative POCs for the reference pictures of P5 are arranged in predetermined orders is transmitted. As described above, in the example illustrated in FIG. 4 illustrating the reference relationship between the P slices, the reference pictures are pictures previous to the current picture in the POC order and the reference pictures in the reference picture set are arranged in the descending order.

Therefore, the magnitudes of the relative POCs in the reference picture set for P5 are arranged in the order of P4, P3, and P0. As shown in Table 6, the magnitude of the relative POC for P4 is 1 and the sign thereof is "–", the magnitude of the relative POC for P3 is 1 and the sign thereof is "–", and the magnitude for the relative POC of P0 is 3 and the sign thereof is "–", which are transmitted through the reference picture set for P5.

Here, regardless of the signs of the relative POCs, a reference picture set in which the reference pictures (the magnitudes of the relative POCs for the reference pictures) previous to the current picture in the POC order are arranged in front in the reference picture set and the reference pictures (the magnitudes of the relative POCs for the reference pictures) subsequent to the current picture are arranged subsequently in the reference picture set may be transmitted. In this case, information indicating the number of reference pictures previous to the current picture in the POC order (reference pictures of which the sign of the relative POC is "–") and the number of reference pictures subsequent to the current picture in the POC order (reference pictures of which the sign of the relative POC is "+") may be transmitted together with information on the magnitudes.

Figure 5:
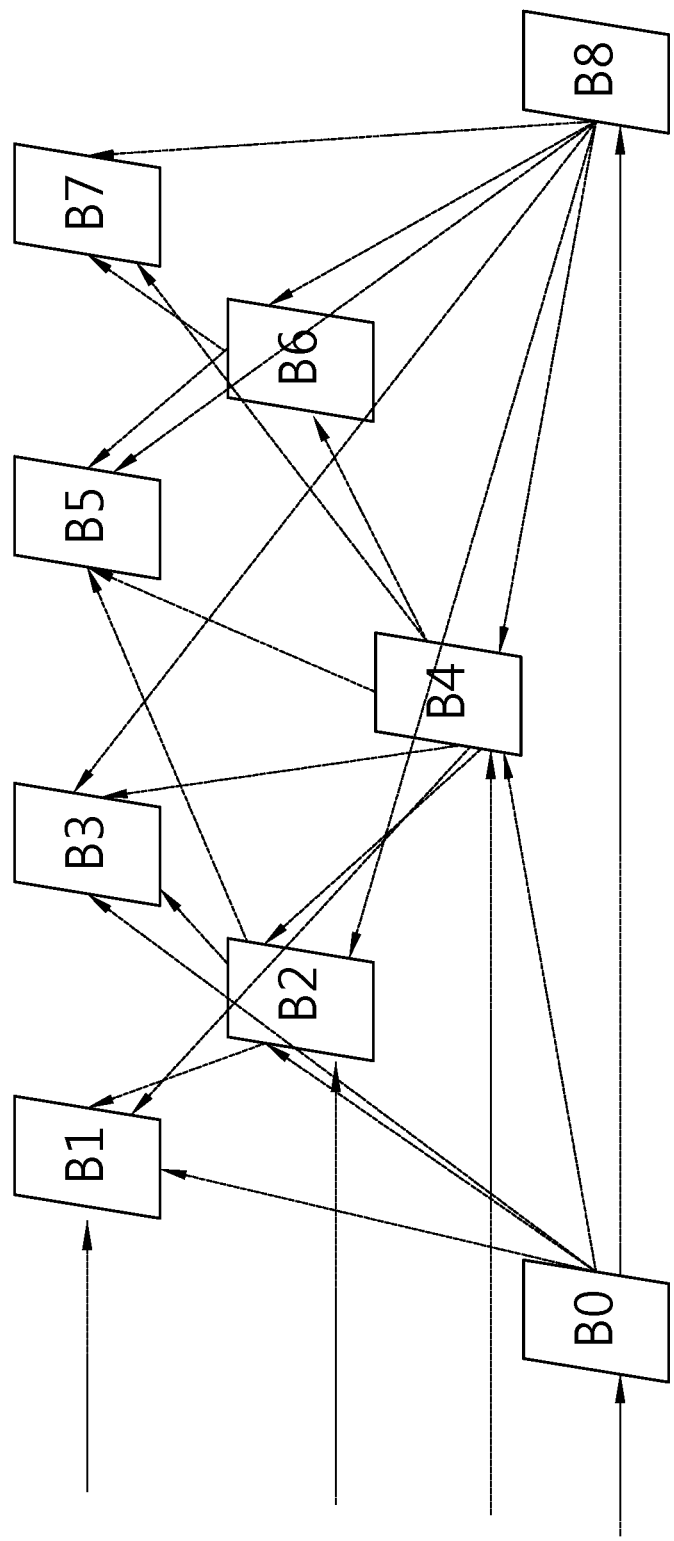
FIG. 5 is a diagram illustrating an example of a reference relationship between B pictures on which bidirectional prediction is performed.

FIG. 5 is a diagram illustrating an example of a reference relationship between B pictures subjected to bi-directional prediction, unlike in FIG. 4 illustrating the reference relationship between P pictures subjected to uni-directional prediction. FIG. 5 schematically illustrates the reference relationship among 9 B pictures B0 to B8.

Table 7 shows an example of a reference picture set to be signaled in FIG. 5, where a reference picture set includes relative POCs of reference pictures.

TABLE 7

|  |  | current picture | | | | | | | | |
|---|---|---|---|---|---|---|---|---|---|---|
|  |  | B0 | B1 | B2 | B3 | B4 | B5 | B6 | B7 | B8 |
| POC of the current picture | | 20 | 21 | 22 | 23 | 24 | 25 | 26 | 27 | 28 |
| reference picture | i = 1 | 12 | 20 | 20 | 22 | 20 | 24 | 24 | 26 | 20 |
| set (POC) | i = 2 | 10 | 18 | 18 | 20 | 18 | 22 | 22 | 24 | 18 |
|  | i = 3 | 8 | 22 | 24 | 24 | 28 | 26 | 28 | 28 | 16 |
|  | i = 4 | 4 | 24 | 28 | 28 |  | 18 |  |  | 12 |
| reference picture | i = 1 | 8 | 1 | 2 | 1 | 4 | 1 | 2 | 1 | 8 |
| set (magnitude of | i = 2 | 2 | 2 | 2 | 2 | 2 | 2 | 2 | 2 | 2 |
| relative POC) | i = 3 | 2 | 1 | 2 | 1 | 4 | 1 | 2 | 1 | 2 |
|  | i = 4 | 4 | 2 | 4 | 4 |  | 2 |  |  | 4 |
| reference picture | i = 1 | – | – | – | – | – | – | – | – | – |
| set (sign of relative | i = 2 | – | – | – | – | – | – | – | – | – |
| POC) | i = 3 | – | + | + | + | + | + | + | + | – |
|  | i = 4 | – | + | + | + |  | + |  |  | – |

In the example of Table 7 and FIG. 5, instead of directly transmitting the POCs of the reference pictures through the reference picture set, the relative POCs for the reference pictures may be transmitted through the reference picture set.

The relative POCs for the reference pictures previous to the current picture in the POC order (the reference pictures having a POC smaller than the POC of the current picture) are POC differences from the immediately-previous reference picture in the reference picture set. The relative POCs for the reference pictures subsequent to the current picture in the POC order (the reference pictures having a POC larger than the POC of the current picture) are POC differences from the immediately-previous reference picture in the reference picture set. Here, the magnitudes of the relative POCS for (1) the first reference picture in the reference picture set and (2) the reference picture of which the sign of the relative POC is different from that of the reference picture previous in the reference picture set are POC differences from the current picture. In other words, the relative POCs for the reference picture closest to the current picture out of the reference pictures previous to the current picture in the POC order in the reference picture set and the reference picture closest to the current picture out of the reference pictures subsequent to the current picture are POC differences from the current picture.

An example where the current picture is B5 will be described with reference to Table 7. The reference picture set includes B4, B2, B6, and B8. When the reference picture set includes the relative POCs, the magnitude of the relative POC to which the lowest index is allocated in the reference picture set is associated with B4 and is 1 which is a difference value between the POC of the current picture and the POC of B4, and the sign thereof is "−". The magnitude of the relative POC to which the second index is allocated is associated with B2 and is 2 which is a difference value between the POC of B4 and the POC of B4, and the sign thereof is "−". The magnitude of the relative POC to which the second index is allocated is associated with B6. Since the sign of the relative POC for B6 is different from the sign of the relative POC for B2 which is the previous reference picture, the magnitude of the relative POC for B6 is 1 which is a POC difference from the current picture and the sign thereof is "+". The magnitude of the relative POC to which the final index is allocated is associated with B8 and 2 which is a difference between the POC of B6 and the POC of B8 and the sign thereof is "+".

As described above, by transmitting only the magnitudes of the relative POCs of the reference pictures to the current picture instead of transmitting all the magnitudes and the signs of the relative POCs of the reference pictures to the current, and transmitting the magnitudes of the relative POCs having a sign of "−" earlier than the magnitudes of the relative POCs having a sign of "+", the sign of the corresponding relative POC may be derived without explicitly transmitting the signs. In this case, information indicating the number of relative POCs having a sign of "−" and the number of relative POCs having a sign of "+" may be transmitted together with information on the magnitudes.

For example, by considering the case where the current picture is B5 in Table 7 again, the video encoder may transmit the reference picture set of B5 including only the magnitudes of the relative POCs of the reference pictures such as (1 2 1 2). As shown in Table 7, the magnitudes of the relative POCs having a sign of "−" are located in front in the reference picture set. The arrangement order is the descending order as described above for the relative POCs having a sign "−" (the relative POCs for the reference pictures previous to the current picture in the POC order), and the ascending order as described above for the relative POCs having a sign of "+" (the relative POCs for the reference pictures subsequent to the current picture in the POC order). At this time, the information indicating the number of relative POCs having a sign of "−" and the number of relative POCs having a sign of "+" may be transmitted along with the reference picture set. For example, it is assumed that an indication that the number of reference pictures (relative POCs) having a sign of "−" in the reference picture set is 2 and the number of reference pictures (relative POCs) having a sign of "+" is 2 is received. Then, since the sign of the two previous relative POCs in the reference picture set is "−" and the sign of two subsequent relative POCs is "+", the video decoder may determine that the magnitudes of the two previous relative POCs in the reference picture set are the magnitudes of the relative POCs for the reference pictures having a POC smaller than the POC of the current picture and the magnitudes of the two subsequent relative POCs in the reference picture set are the magnitudes of the relative POCs for the reference pictures having a POC larger than the POC of the current picture.

Figure 6:
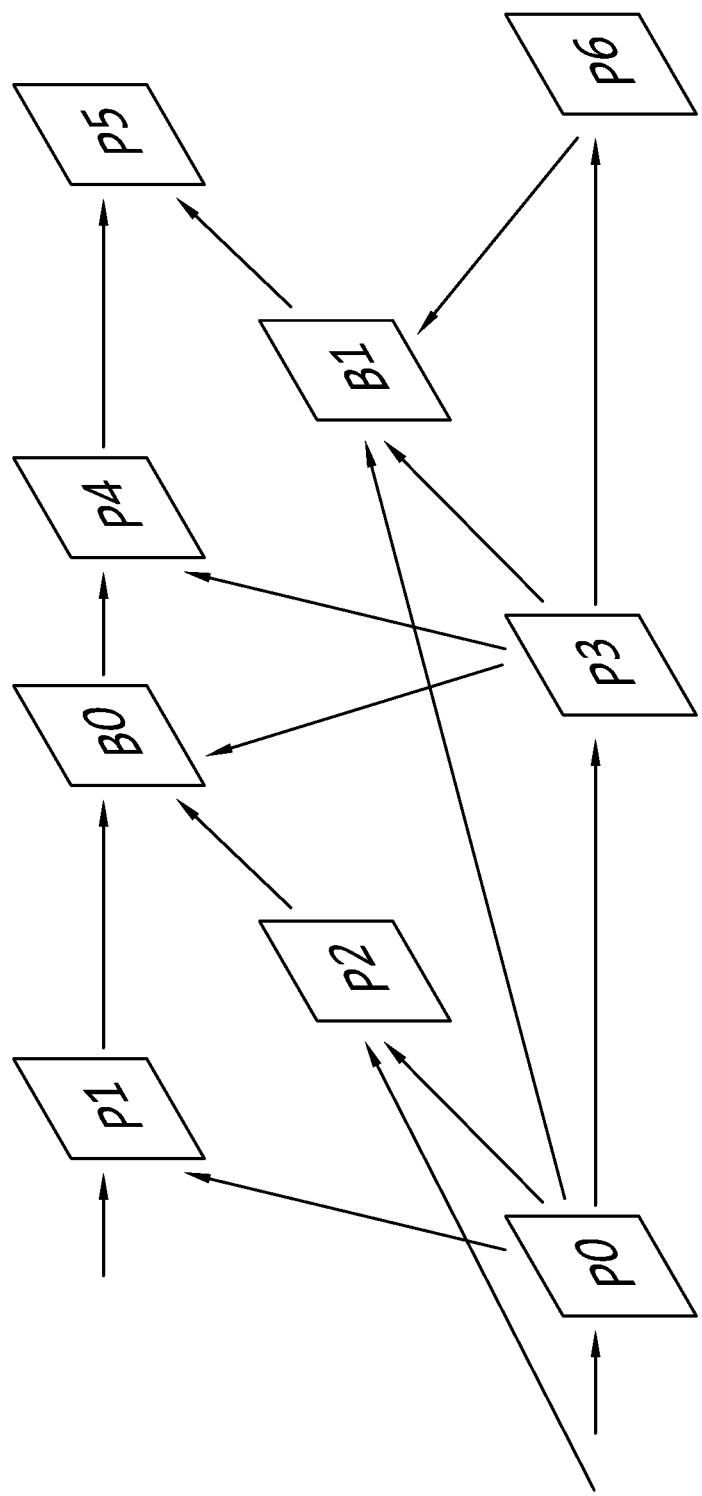
FIG. 6 is a diagram illustrating an example of a reference relationship between a B picture and a P picture.

FIG. 6 is a diagram schematically illustrating an example of a reference relationship between a B picture and a P picture.

FIG. 6 illustrates the reference relationship between 7 P pictures P0 to P6 subjected to uni-directional prediction and two B pictures B0 and B1 subjected to bi-directional prediction.

Table 8 shows an example of a reference picture set to be signaled in FIG. 6, where a reference picture set includes relative POCs of reference pictures.

TABLE 8

| | | current picture | | | | | | | | |
|---|---|---|---|---|---|---|---|---|---|---|
| | | P0 | P1 | P2 | B0 | P3 | P4 | B1 | P5 | P6 |
| POC of the current picture | | 20 | 21 | 22 | 23 | 24 | 25 | 26 | 27 | 28 |
| reference picture set (POC) | i = 1 | 19 | 20 | 21 | 22 | 23 | 24 | 24 | 26 | 27 |
| | i = 2 | 16 | 19 | 20 | 21 | 20 | 23 | 20 | 25 | 24 |
| | i = 3 | | | 16 | 16 | 24 | | 20 | 28 | 24 |
| reference picture set (magnitude of relative POC) | i = 1 | 1 | 1 | 1 | 1 | 1 | 1 | 2 | 1 | 1 |
| | i = 2 | 3 | 1 | 1 | 1 | 3 | 1 | 4 | 1 | 3 |
| | i = 3 | | | 3 | 4 | 1 | | 3 | 2 | 1 |
| reference picture set (sign of relative POC) | i = 1 | − | − | − | − | − | − | − | − | − |
| | i = 2 | − | − | − | − | − | − | − | − | − |
| | i = 3 | | | − | − | + | | − | + | − |

Table 8 and FIG. 6 are associated with cases where P pictures and B pictures are mixed, but the method of inducing the magnitudes and the signs of the relative POCs, the method of arranging the relative POCs in a reference picture set, and the like are the same as described above.

For example, when the current picture is B1, the reference picture set for B1 includes relative POCs for P3, P0, and P6. The reference picture set includes the magnitudes (2 4 2) and the signs of the relative POCs of P3, P0, and P6 and may be transmitted to the video decoder.

In this case also, instead of transmitting information indicating the signs of the relative POCs, information indicating the number of relative POCs having a sign "−" and the number of relative POCs having a sign of "+" on the basis of the arrangement order may be transmitted together with the reference picture set including the magnitudes of the relative POCs. For example, when the current picture is B1, the reference picture set (2 4 2) including the magnitudes of the relative POCs and the information indicating that the number of relative POCs having a sign of "−" is 2 and the number of relative POCs having a sign of "+" is 1 may be transmitted.

Figure 7:
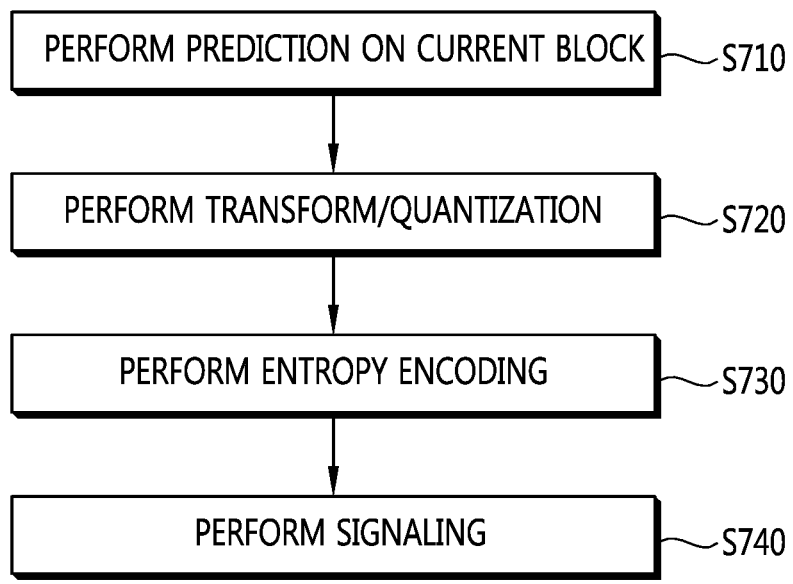
FIG. 7 is a flowchart schematically illustrating an encoding procedure which is performed by the video encoder according to the present invention.

FIG. 7 is a flowchart schematically illustrating an encoding procedure which is performed by a video encoder according to the present invention. The video encoder performing the encoding procedure illustrated in FIG. 7 corresponds to the video encoder described above with reference to FIG. 1.

Referring to FIG. 7, the video encoder performs a prediction on a current block (S710). The video encoder may perform inter prediction or intra prediction on the current block. When the inter prediction is performed, reference pictures of the current block may be selected/designated using a reference picture list constructed as described above.

The video encoder transforms/quantizes the prediction result on the current block (S720). The video encoder may transform/quantize a residual block corresponding to a difference between the prediction result and the original block. When the intra prediction is performed, information on the performed intra prediction mode may be transformed/quantized. When the inter prediction is performed, motion information (information on motion vectors/reference pictures) may be transformed/quantized.

The video encoder entropy-encodes the transformed/quantized information (S730). The CABAC may be used as the entropy encoding method.

The video encoder signals the entropy-encoded information (S740). At this time, the signaled information includes a reference picture set for constructing a reference picture list for the current picture (the current block). The reference picture set may be constructed for each slice and may be transmitted in a state where it is included in the slice header.

The reference picture set may include POCs of reference pictures for the current block. The reference picture set may include relative POCs for the reference pictures to reduce transmission overhead.

When the reference picture set is includes the relative POCs for the reference pictures, the magnitudes and the signs of the relative POCs for the pictures available as the reference pictures of the current picture may be transmitted through the reference picture set, and the number of relative POCs having a sign of "−" and the number of relative POCs having a sign of "+" along with the magnitudes of the relative POCs may be transmitted. When the relative POCs are transmitted, the relative POCs having a sign of "−" are first transmitted and the relative POCs having a sign of "+" are then transmitted. The relative POCs having a sign of "−" may be arranged in the descending order on the basis of the POCs of the reference pictures, and the relative POCs having a sign of "+" may be arranged in the ascending order on the basis of the POCs of the reference pictures.

While the operations of the video encoder are schematically described with reference to FIG. 7 so as to easily understand the present invention in consideration of the details of the reference picture set, this is for convenience of explanation and the operations of the video encoder according to the present invention may include the operations described with reference to FIG. 1.

Figure 8:
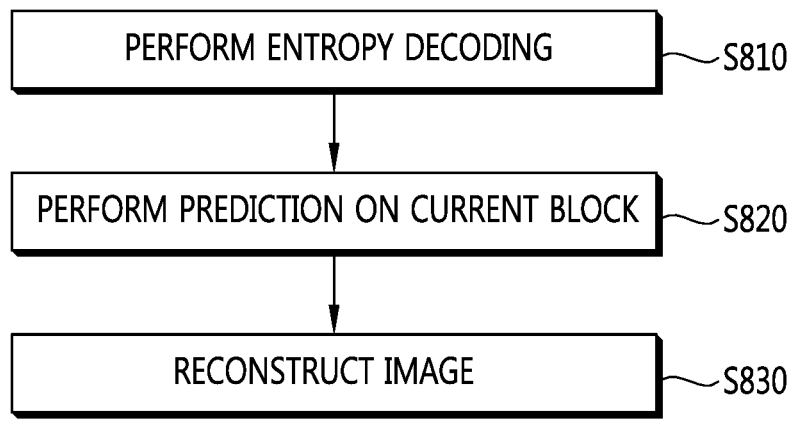
FIG. 8 is a flowchart schematically illustrating a decoding procedure which is performed by the video decoder according to the present invention.

FIG. 8 is a flowchart schematically illustrating a decoding procedure which is performed by a video decoder according to the present invention.

Referring to FIG. 8, the video decoder receives a bitstream from the video encoder and performs an entropy decoding (S810). The bitstream received from the video encoder may include a reference picture set. The reference picture set may be received in a state where it is included in the slice header.

The reference picture set may include POCs of reference pictures for a current block or may include relative POCs for the reference pictures.

The video decoder may receive information indicating pictures available as the reference pictures of the current picture through the reference picture set. For example, the POCs of the pictures available as the reference pictures may be received through the reference picture set. When the reference picture set includes (1) the magnitudes and the signs of the relative POCs of the reference pictures or includes (2) the magnitudes of the relative POCs for the reference pictures and the numbers of relative POCs having a sign of "−" and a sign of "+", the POC of the corresponding reference picture may be derived using the method shown in Table 4 on the basis of the received information.

When the relative POCs are received through the reference picture set, the relative POCs having a sign of "−" are first received and the relative POCs having a sign of "+" are then received. The relative POCs having a sign of "−" are arranged in the descending order based on the POCs of the reference pictures, and the relative POCs having a sign of "+" may be arranged in the ascending order based on the POCs of the reference pictures.

The video decoder may perform a prediction on the current block on the basis of the entropy-decoded information (S820). The prediction method for the current block may be transmitted from the video encoder. When the prediction method for the current block is inter prediction, the video decoder may perform the prediction using the reference picture list constructed on the basis of the received reference picture set.

The method of constructing the reference picture list using the reference picture set is the same as described above. The constructed reference picture list may be stored in the memory of the video decoder.

The video decoder reconstructs a picture (S830). The video decoder may reconstruct the current block on the basis of the prediction on the current block and may reconstruct a picture (image) using the reconstructed blocks. When a skip mode is used, the residual signal is not transmitted and thus the predicted block may be used as a reconstructed block. When a merge mode or an MVP mode is used, the video decoder may reconstruct the current block by adding the predicted block and the residual block.

In this description, terms such as a "picture included in a reference picture set" and an "x-th picture in a reference picture set" are used, but these terms are intended for convenience of explanation. A picture in the reference picture set may be a picture of which the POC information is included in the reference picture set. The x-th picture in the reference picture set may be a picture of which the POC information element is arranged at the x-th position in the reference picture set.

On the other hand, the reference relationship between pictures illustrated in FIGS. 4 to 6 does not consider a temporal level, but this is for understanding of the invention and the present invention is not limited to this configuration. The present invention may be similarly applied to cases where only pictures of levels lower than the current picture are referred to in consideration of the temporal level. In this case, the reference relations shown in Tables 5 to 8 may be changed accordingly.

While the methods in the above-mentioned embodiments have been described on the basis of the flowcharts as a series of steps or blocks, the invention is not limited to the order of the steps and a certain step may be performed in an order other than described above or at the same time as described above. The above-mentioned embodiments include various examples. Therefore, the invention includes all substitutions, corrections, and modifications belonging to the appended claims.

When it is mentioned above that an element is "connected to" or "coupled to" another element, it should be understood that still another element may be interposed therebetween, as well as that the element may be connected or coupled directly to another element. On the contrary, when it is mentioned that an element is "connected directly to" or "coupled directly to" another element, it should be understood that still another element is not interposed therebetween.

The invention claimed is:

1. An inter prediction method performed by a decoding apparatus, the method comprising:
    obtaining picture order count (POC) information of reference pictures, which are used for inter prediction of a current picture and are prior to the current picture in a decoding order, from a bitstream;
    deriving picture order count (POC) values for specifying the reference pictures based on the picture order count (POC) information;
    constructing a reference picture list including the reference pictures based on the derived picture order count (POC) values of the reference picture; and
    performing the inter prediction on a current block based on the reference picture list to derive a predicted sample of the current block,
    wherein a picture order count (POC) value for specifying an i-th reference picture is derived based on a picture order count (POC) difference indicated by the picture order count (POC) information, wherein the picture order count (POC) information is included in a slice header,
    wherein the picture order count (POC) difference specifies a difference between picture order count (POC) values of the current picture and the i-th reference picture based on the i-th reference picture being a firstly-ordered reference picture specified by the picture order count (POC) information, and
    wherein the picture order count (POC) difference specifies a difference between picture order count (POC) values of the i-th reference picture and an (i−1)-th reference picture based on the i-th reference picture being a secondly-ordered reference picture or a subsequent reference picture specified by the picture order count (POC) information.

2. The method of claim 1, wherein deriving the picture order count (POC) values includes
    deriving picture order count (POC) differences for the reference pictures previous to the current picture in the picture order count (POC) order, in a descending order of the picture order count (POC) order, and
    deriving the picture order count (POC) differences for the reference pictures subsequent to the current picture in the picture order count (POC) order, in an ascending order of the picture order count (POC) order.

3. The method of claim 1, wherein picture order count (POC) differences for the reference pictures previous to the current picture in the picture order count (POC) order have a negative sign, and
    wherein picture order count (POC) differences for the reference pictures subsequent to the current picture in the picture order count (POC) order have a positive sign.

4. The method of claim 1, wherein indices are allocated based on the descending order of picture order count (POC) values to the reference pictures previous to the current picture and then indices are allocated based on the ascending order of picture order count (POC) values to the reference pictures subsequent to the current picture in the reference picture list.

5. The method of claim 1, wherein indices are allocated based on the ascending order of picture order count (POC) values to the reference pictures subsequent to the current picture and then indices are allocated based on the descending order of picture order count (POC) values are allocated to the reference pictures previous to the current picture in the reference picture list.

6. A video encoding method performed by an encoding apparatus, the method comprising:
    deriving picture order count (POC) values of reference pictures which are used for inter prediction of a current picture and are prior to the current picture in a decoding order;
    deriving picture order count (POC) information of the reference pictures, wherein the picture order count (POC) information indicates picture order count (POC) differences for the reference pictures based on the derived picture order count (POC) values; and
    encoding video information including the picture order count (POC) information,
    wherein the picture order count (POC) information indicates a picture order count (POC) difference for an i-th reference picture for representing a picture order count (POC) value of the i-th reference picture, wherein the picture order count (POC) information is included in a slice header,
    wherein the picture order count (POC) difference specifies a difference between picture order count (POC) values of the current picture and the i-th reference picture based on the i-th reference picture being a firstly-ordered reference picture specified by the picture order count (POC) information, and
    wherein the picture order count (POC) difference specifies a difference between picture order count (POC) values of the i-th reference picture and an (i−1)-th reference picture based on the i-th reference picture being a secondly-ordered reference picture or a subsequent reference picture specified by the picture order count (POC) information.

7. The method of claim 6, wherein deriving the picture order count (POC) values includes
    deriving picture order count (POC) differences for the reference pictures previous to the current picture in the picture order count (POC) order, in a descending order of the picture order count (POC) order, and
    deriving the picture order count (POC) differences for the reference pictures subsequent to the current picture in the picture order count (POC) order, in an ascending order of the picture order count (POC) order.

8. The method of claim 6, wherein picture order count (POC) differences for the reference pictures previous to the current picture in the picture order count (POC) order have a negative sign, and wherein picture order count (POC) differences for the reference pictures subsequent to the current picture in the picture order count (POC) order have a positive sign.

9. The method of claim 6, wherein indices are allocated based on the descending order of picture order count (POC) values to the reference pictures previous to the current picture and then indices are allocated based on the ascending order of picture order count (POC) values to the reference pictures subsequent to the current picture in the reference picture list.

10. The method of claim 6, wherein indices are allocated based on the ascending order of picture order count (POC) values to the reference pictures subsequent to the current picture and then indices are allocated based on the descending order of picture order count (POC) values are allocated to the reference pictures previous to the current picture in the reference picture list.

11. A non-transitory decoder-readable storage medium storing the encoded video information generated by a video encoding method comprising: deriving picture order count (POC) values of reference pictures which are used for inter prediction of a current picture and are prior to the current picture in a decoding order; deriving picture order count (POC) information of the reference pictures, wherein the picture order count (POC) information indicates picture order count (POC) differences for the reference pictures based on the derived picture order count (POC) values; and encoding video information including the picture order count (POC) information, wherein the picture order count (POC) information indicates a picture order count (POC) difference for an i-th reference picture for representing a picture order count (POC) value of the i-th reference picture, wherein the picture order count (POC) information is included in a slice header, wherein the picture order count (POC) difference specifies a difference between picture order count (POC) values of the current picture and the i-th reference picture based on the i-th reference picture being a firstly-ordered reference picture specified by the picture order count (POC) information, and wherein the picture order count (POC) difference specifies a difference between picture order count (POC) values of the i-th reference picture and an (i−1)-th reference picture based on the i-th reference picture being a secondly-ordered reference picture or a subsequent reference picture specified by the picture order count (POC) information.

\* \* \* \* \*